(12) United States Patent
Alpern

(10) Patent No.: US 8,321,838 B2
(45) Date of Patent: *Nov. 27, 2012

(54) TECHNIQUES FOR DEBUGGING COMPUTER PROGRAMS INVOLVING MULTIPLE COMPUTING MACHINES

(75) Inventor: David M. Alpern, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1076 days.

This patent is subject to a terminal disclaimer.

(21) Appl. No.: 12/022,076

(22) Filed: Jan. 29, 2008

(65) Prior Publication Data

US 2008/0141222 A1 Jun. 12, 2008

Related U.S. Application Data

(63) Continuation of application No. 10/143,890, filed on May 10, 2002, now Pat. No. 7,350,194.

(60) Provisional application No. 60/324,722, filed on Sep. 24, 2001.

(51) Int. Cl.
*G06F 9/44* (2006.01)
*G06F 11/00* (2006.01)

(52) U.S. Cl. .......... 717/124; 717/114; 717/136; 714/11
(58) Field of Classification Search ........................ None
See application file for complete search history.

(56) References Cited

U.S. PATENT DOCUMENTS

| | | | | |
|---|---|---|---|---|
| 5,247,676 A | * | 9/1993 | Ozur et al. ..................... | 719/328 |
| 5,325,530 A | * | 6/1994 | Mohrmann .................... | 717/124 |
| 5,361,352 A | * | 11/1994 | Iwasawa et al. ............... | 717/124 |
| 5,371,746 A | * | 12/1994 | Yamashita et al. ............ | 714/38 |
| 5,430,876 A | * | 7/1995 | Schreiber et al. ............. | 719/328 |
| 5,457,797 A | * | 10/1995 | Butterworth et al. ......... | 719/320 |
| 5,787,245 A | * | 7/1998 | You et al. ...................... | 714/38 |
| 5,794,047 A | * | 8/1998 | Meier .......................... | 717/133 |
| 5,802,371 A | * | 9/1998 | Meier .......................... | 717/133 |
| 5,818,445 A | * | 10/1998 | Sanderson et al. ............ | 715/744 |
| 5,901,315 A | * | 5/1999 | Edwards et al. .............. | 717/124 |
| 6,026,362 A | * | 2/2000 | Kim et al. ..................... | 705/317 |
| 6,038,684 A | * | 3/2000 | Liddell et al. ................. | 714/11 |
| 6,126,328 A | | 10/2000 | Mallory et al. | |

(Continued)

OTHER PUBLICATIONS

Jean-Pierre Briot and Rachid Guerraoui, A Classification of Various Approaches for Object-Based Parallel and Distributed Programming [online], retrieved on Mar. 2, 2012, pp. 1-27. Retrieve from Internet: <URL: www.rebelscience.org/download/cosa002.pdf>.*

(Continued)

*Primary Examiner* — Thuy Dao
*Assistant Examiner* — Hanh T Bui
(74) *Attorney, Agent, or Firm* — Hickman Palermo Truong Becker Bingham Wong LLP

(57) ABSTRACT

Techniques for debugging a computer program that includes multiple modules executing on multiple machines include receiving, at a unifying component, first data from a first machine. The first data indicates debugging information generated by the first machine. Second data is also received at the unifying component from a second machine. The second data indicates debugging information generated by the second machine. Based on the first data and the second data, third data is formed indicating a single integrated representation of debugging information for the computer program. The unifying component allows debugging information from several machines to be integrated and then presented to a user through a single debugger client.

18 Claims, 13 Drawing Sheets

U.S. PATENT DOCUMENTS

| | | | | |
|---|---|---|---|---|
| 6,173,414 | B1* | 1/2001 | Zumkehr et al. | 714/11 |
| 6,275,980 | B1* | 8/2001 | Uchihira et al. | 717/124 |
| 6,314,429 | B1 | 11/2001 | Simser | |
| 6,353,923 | B1* | 3/2002 | Bogle et al. | 717/128 |
| 6,412,106 | B1* | 6/2002 | Leask et al. | 717/124 |
| 6,477,540 | B1* | 11/2002 | Singh et al. | 1/1 |
| 6,704,887 | B2* | 3/2004 | Kwiat et al. | 714/11 |
| 6,721,941 | B1* | 4/2004 | Morshed et al. | 717/124 |
| 6,772,367 | B1* | 8/2004 | Tarafdar et al. | 714/11 |
| 6,826,746 | B2* | 11/2004 | Evans et al. | 717/124 |
| 7,107,578 | B1* | 9/2006 | Alpern | 717/137 |
| 7,350,194 | B1* | 3/2008 | Alpern | 717/136 |
| 7,496,895 | B1* | 2/2009 | Mosterman et al. | 717/124 |
| 7,665,066 | B2* | 2/2010 | Sauer et al. | 717/124 |
| 7,752,599 | B2* | 7/2010 | Takacsi-Nagy et al. | 717/114 |
| 7,774,750 | B2* | 8/2010 | Chrysanthakopoulos | 717/114 |
| 8,020,148 | B2* | 9/2011 | Robertsson | 717/124 |
| 8,024,708 | B2* | 9/2011 | Demetriou et al. | 717/124 |
| 2001/0020293 | A1* | 9/2001 | Uchihira et al. | 717/4 |
| 2003/0167423 | A1* | 9/2003 | Murakami et al. | 717/124 |
| 2005/0235260 | A1* | 10/2005 | Matsutsuka et al. | 717/114 |
| 2005/0283659 | A1* | 12/2005 | Lamport et al. | 714/11 |
| 2006/0048098 | A1* | 3/2006 | Gatlin et al. | 717/124 |
| 2006/0101405 | A1* | 5/2006 | Buschardt et al. | 717/124 |
| 2006/0195822 | A1* | 8/2006 | Beardslee et al. | 717/124 |
| 2007/0294671 | A1* | 12/2007 | Demetriou et al. | 717/124 |
| 2010/0251223 | A1* | 9/2010 | Gordy et al. | 717/136 |

OTHER PUBLICATIONS

Yun Mao et al., MOSAIC: Unified Declarative Platform for Dynamic Overlay Composition [online], retrieved on Mar. 2, 2012, pp. 1-12. Retrieve from Internet: <URL: http://delivery.acm.org/10.1145/1550000/1544017/a5-mao.pdf?>.*

"MicrosoftC/C++ Version 7.0, Environment and Tools for MS-DOS and Windows Operating Systems", Microsoft Corporation, 1991, pp. 393-398.

Klaus-Peter Lohr et al., "DAPHNE-Support for Distributed Applications Programming in Heterogeneous Computer Networks", IEEE, pp. 63-71, 1988.

Antonio Corradi et al., "Error Recovery Mechanisms for Remote Procedure Call-Based Systems", IEEE, 1989, pp. 502-507.

Charles A. Meyer et al., "Design and Test Strategies for a Safety-Critical Embedded Executive", ACM, Dec. 1996, pp. 29-37.

Helge Behrends, "Simulation-based Debugging of Active Databases", IEEE, Feb. 1994, pp. 172-180.

Johnson, M., "A Software Debugging Glossary" (1981) Hewlett Packard.

* cited by examiner

623
RECEIVE, FROM DEBUGGER CLIENT, DEBUG MESSAGE WITH
BREAK POINTS OR VARIABLE OBJECT IDS FOR ANY MODULE

624
DETERMINE BREAK POINTS AND VARIABLE OBJECT IDS
WITHIN MODULES EXECUTED BY CURRENT VIRTUAL MACHINE

626
TRANSLATE BREAK POINTS AND VARIABLE OBJECT IDS
FROM FIRST LANGUAGE TO SECOND LANGUAGE
OF CURRENT VIRTUAL MACHINE

628
GENERATE MODIFIED DEBUG MESSAGE
WITH BREAK POINTS AND VARIABLE OBJECT IDS
WITHIN MODULES EXECUTED BY CURRENT VIRTUAL MACHINE

630
SEND TO CURRENT VIRTUAL MACHINE MODIFIED DEBUG MESSAGE

632 ANOTHER VIRTUAL MACHINE ?
NO → 635 END
YES → 634 MAKE NEXT VIRTUAL MACHINE THE CURRENT VIRTUAL MACHINE

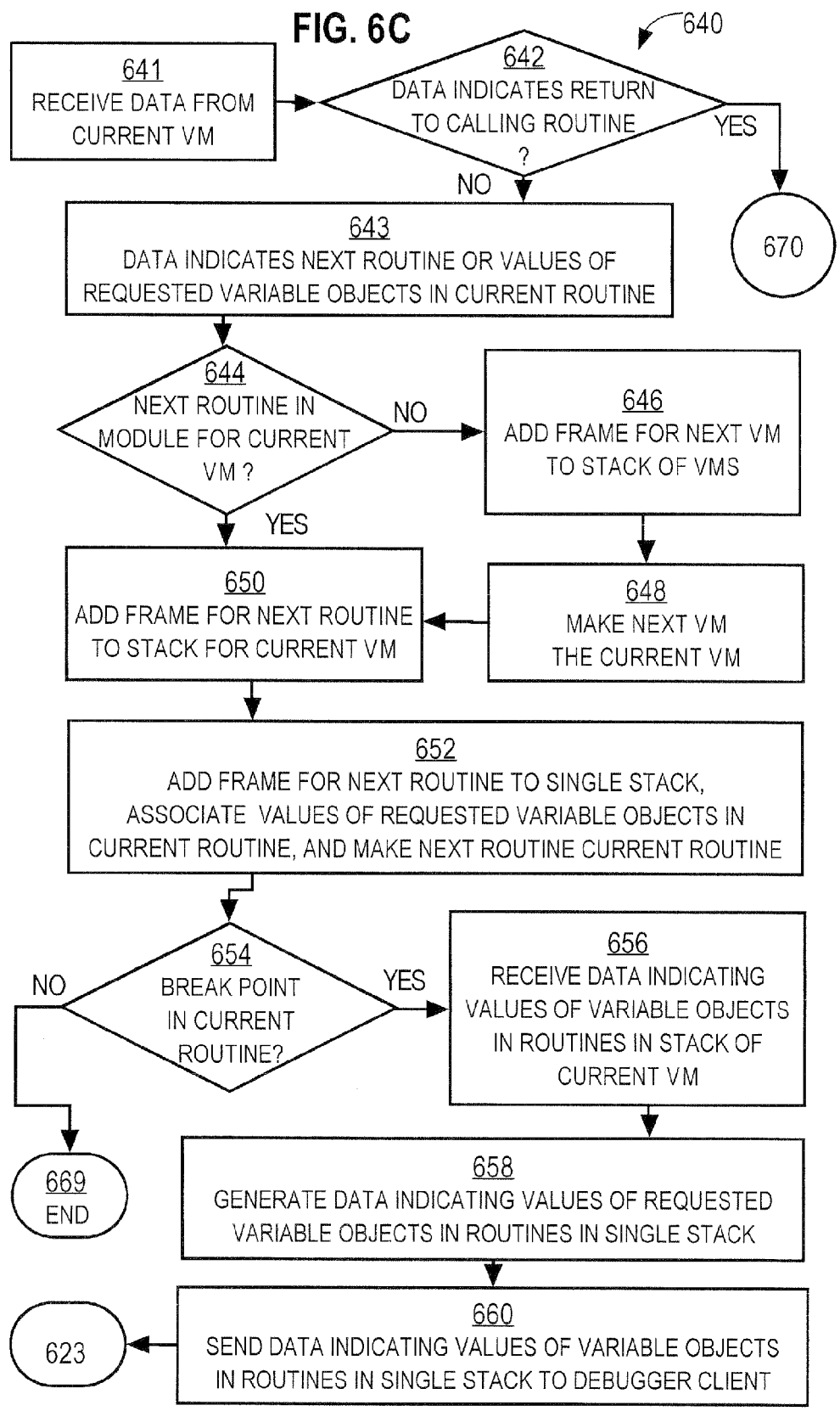

TECHNIQUES FOR DEBUGGING COMPUTER PROGRAMS INVOLVING MULTIPLE COMPUTING MACHINES

CLAIM OF PRIORITY

This application is a continuation of U.S. patent application Serial No. 10/143,890, filed on May 10, 2002, and issued as U.S. Pat. No. 7,350,194 on March 25, 2008, which application claims the benefit of priority to U.S. Provisional Patent Application No. 60/324,722, filed Sep. 24, 2001, the entire contents of each of which are hereby incorporated by reference as if fully set forth herein.

FIELD OF THE INVENTION

The present invention relates to debugging a computer program. In particular, the present invention relates to debugging a computer program that is executed by multiple virtual machines.

BACKGROUND

Computer programs are instructions for controlling processors in computing devices. Computer programs are typically written in one or more high level languages that are easy for a human being to understand. These source language statements are then typically compiled by a special type of program called a compiler and converted to coded instructions, which often correspond to the actual operations performed by a processor in a computer device. Frequently the coded instructions are not identical to the native instructions for the processor, but, instead, are instructions for a particular virtual machine. A virtual machine is a process that interprets coded instructions and executes them. The virtual machine itself is an executable sequence of instructions in the native language of the processor. Virtual machines are sometimes called interpreters. As used herein, the term "machines" includes virtual machines interpreting virtual machine instructions, operating systems interpreting operating system instructions, and processors executing native instructions.

An advantage of a virtual machine is that the same coded instructions for a particular virtual machine may be used on multiple computer devices built with different processors supporting different native instructions. The particular virtual machine is formed separately, using instructions from a different native instruction set for each different processor. Then, any program written in or compiled to the coded instructions for the particular virtual machine can be executed on any processor that executes the particular virtual machine. Examples of virtual machines include the Java virtual machine (JVM), the BASIC interpreter, the VisualBasic interpreter, and the interpreter for the PL/SQL language of the Oracle Corporation.

When a program is written or modified, it may be compiled successfully into coded instructions, and yet still not perform correctly when executed by the virtual machine. To assist a programmer in determining how the program executes differently than expected, debuggers have been developed for virtual machines. Debuggers are processes that provide functions that enable a programmer to determine the contents of computer memory at a time of execution for any instruction in one or more sequences of instructions.

Virtual machine debuggers typically include a debugger client process that interacts with an interface of the virtual machine. The debugger client process executes on a user's computing device that includes a display device. The debugger client process typically presents information about high-level language statements, and the contents of memory when the statements are executed. The debugger client process also includes controls that the user can operate to indicate which memory contents to display, and to indicate the next set of one or more instructions to execute before reporting the contents of memory, or to indicate a particular instruction at which execution is stopped and memory contents reported. In response to user actions, the debugger client process interacts with the debugger interface in the virtual machine. For example, the debugger client process sends a message to the virtual machine requesting that the virtual machine execute the next instruction and return the contents of one or more memory locations. As another example, the debugger client process invokes one or more routines of the virtual machine to execute the next instruction. As used herein, the term "routine" refers to a sequence of instructions ending in a return to a calling entity. Other terms commonly used for routines include "functions," "procedures," "methods," and "subroutines." The main block of code that is first executed for a program that often returns control to an operating system is also a routine. The debugger client process often presents to the user the context of program execution using a stack of routines that have been called but have not yet returned control to the calling routine.

In general, coded instructions from one or more modules can be linked to form an executable program. Modules can consist of source language statements, coded instructions for a particular virtual machine, runtime executables, or some combination of these, with or without associated data. Modules in a high-level source language may be compiled by a run time compiler to produce corresponding modules in coded instructions.

It is becoming more common to create programs that include heterogeneous modules. For example, a program may include a machine-executable module, a module executable by a first type of virtual machine, and a module executable by a second type of virtual machine. During execution of the program, a routine in the machine-executable module may call a routine in the module running in a first type of virtual machine, and that routine may call another routine in the module running in a second type of virtual machine.

In addition, it is common for programs executing on different processors to interact with each other. For example, a database application program, such as an accounting program, runs on one processor on one device on a network. However, while running, the accounting program may cause a database procedure, such as an average salary computation procedure, to be launched by a database server and run on a second processor on a different device on the network. Even if the database application program and the stored procedure are implemented with coded instructions for the same type of virtual machine (e.g. both programs are Java programs), each processor is running a separate instance of the particular virtual machine. In many situations, the interacting programs will not only be running on different virtual machines, but will employ coded instructions for different types of virtual machines (e.g. one will be a Java program, while the other is a Visual BASIC program).

While computer programs now often include multiple modules executed by different virtual machines or different instances of the same virtual machine, the debuggers currently available are typically not designed to handle these situations. For example, while the human user thinks about the program as a single entity, the program's execution is typically displayed as a series of separate stacks, one stack for each instance of each virtual machine.

A programmer who wants to trace the contents of memory while executing a set of instructions that spans two modules run on separate virtual machines usually operates separate debugger clients for the two modules and interacts separately with the two instances of the virtual machine. Memory contents could be manually copied from the user interface of one debugger client and inserted in the user interface of a separate debugger client. The manual process is tedious and subject to increased risk of human errors. The tedium and risk of error are multiplied as the number of separate interacting modules that are to be debugged increases.

Based on the foregoing, there is a clear need for a debugger process that presents debug information in an intuitive manner even for programs that include multiple modules executing on multiple virtual machines. As used herein, "multiple virtual machines" refers to multiple instances of the same virtual machine, virtual machines for different languages, or both.

SUMMARY

Techniques are provided for debugging a computer program that includes multiple modules executing on multiple machines. In one aspect of the invention, the techniques include receiving, at a unifying component, first data from a first machine. The first data indicates debugging information generated by the first machine. Second data is also received at the unifying component from a second machine. The second data indicates debugging information generated by the second machine. Based on the first data and the second data, third data is formed indicating a single integrated representation of debugging information for the computer program.

According to an embodiment of this aspect of the invention, the techniques include sending the third data from the unifying component to a debugger process for presentation to a user.

The unifying component allows debugging information from several machines to be integrated and then presented to a user through a single debugger client.

According to another aspect of the invention, techniques for debugging a computer program that includes multiple modules executing on multiple machines, includes receiving, at a first unifying component, first data from a first machine and second data from a different unifying component. The first data includes debugging information generated by the first machine. The different unifying component is associated with a subset of the machines. The second data includes debugging information generated by the subset of machines. Based on the first data and the second data, third data is formed indicating a single integrated representation of debugging information for the computer program.

The unifying components allow debugging information from several tiers of machines to be integrated and then presented to a user through a single debugger client.

According to another aspect of the invention, techniques for debugging a computer program that includes multiple modules executing on multiple machines, include receiving, at a unifying component, a first message from a debugger process. The first message specifies a debugging operation associated with a request set of one or more instructions or objects of the computer program, or both. In response to receiving the first message, the unifying component determines that a first machine is associated with a module that includes at least one member of the request set. Based on the first message, the unifying component generates a second message indicating the debugging operation associated with the member of the request set. The unifying component sends the second message to the first machine.

According to embodiments of this aspect of the invention, the unifying component determines that a second machine is associated with another module that includes at least a different member of the request set. Based on the first message, the unifying component generates a third message indicating the debugging operation associated with the different member. The unifying component sends the third message to the second machine.

The unifying component thus allows a single, conventional debugger client to control the debugging operations of several machines.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6B is a flowchart illustrating a method at a unifying process for debugging a computer program executed by multiple virtual machines based on a message from a debugger client, according to an embodiment;

FIG. 6C and FIG. 6D make up a flowchart illustrating a method at a unifying process for debugging a computer program executed by multiple virtual machines based on a message from a virtual machine, according to an embodiment

DETAILED DESCRIPTION

A method and apparatus for debugging computer programs involving multiple machines is described. In the following description, for the purposes of explanation, numerous specific details are set forth in order to provide a thorough understanding of the present invention. It will be apparent, however, to one skilled in the art that the present invention may be practiced without these specific details. For example, embodiments of the invention are described below in the context of multiple virtual machines; however, other embodiments of the invention may involve a machine executing instructions native to a processor, or a machine executing operating system instructions, in place of one, several, or all of the virtual machines. In other instances, well-known structures and devices are shown in block diagram form in order to avoid unnecessarily obscuring the present invention.

Structural Overview

Figure 1:
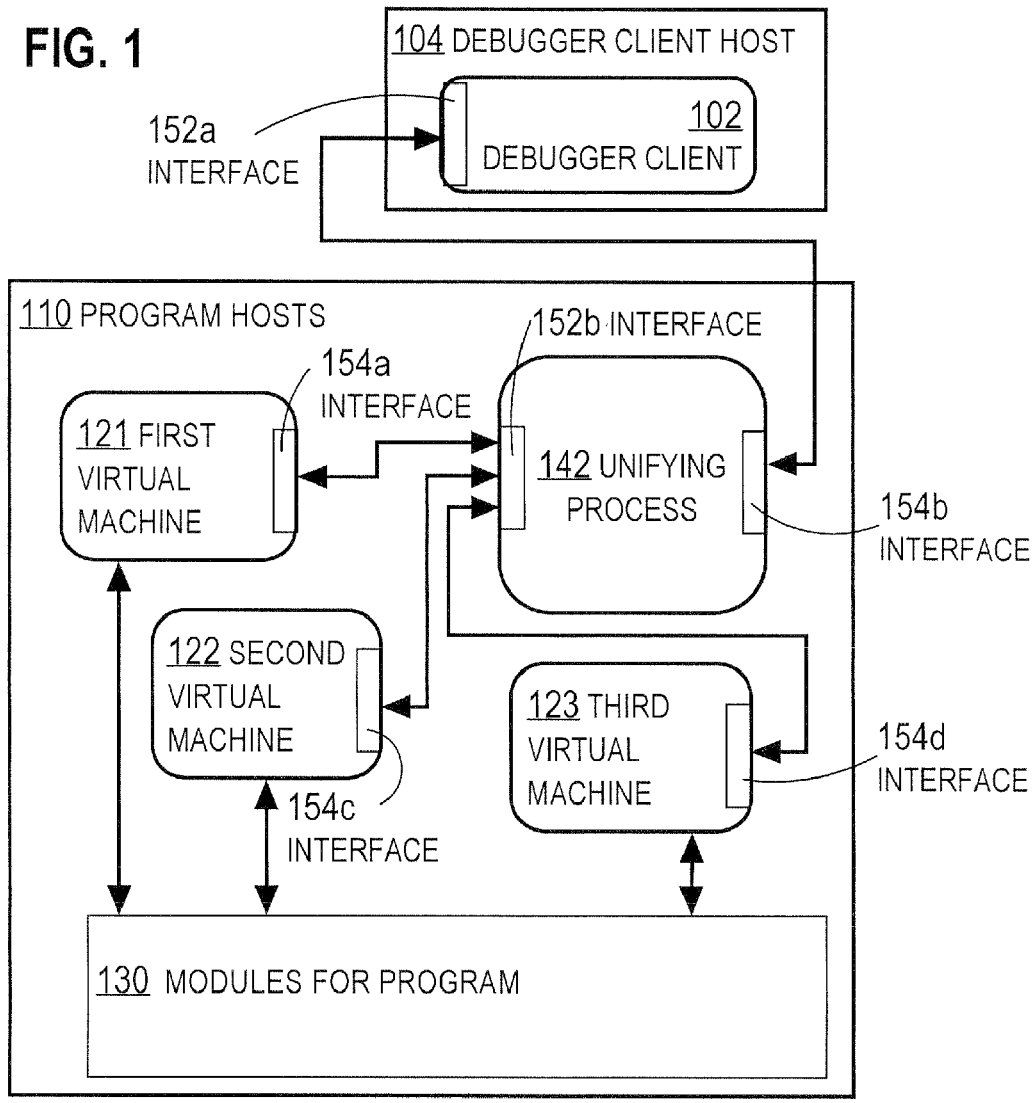
FIG. 1 is a block diagram of a system for unifying debugging information from multiple virtual machines according to an embodiment.

FIG. 1 is a block diagram of a system for unifying debugging information from multiple virtual machines according to an embodiment. A multiple module program executes on one or more program hosts 110, for example to provide a service over a network. The program modules 130 are stored on the program hosts 110. For example, a Java program is made up of Java modules stored in modules 130 for the program. The program modules 130 are executed by multiple virtual machines, for example, first virtual machine 121, second virtual machine 122, and third virtual machine 123.

The system also includes a debugger client 102 executing on a debugger client host 104. The debugger client 102 includes an interface 152a for communicating with the virtual machines 121, 122, 123. The virtual machines 121, 122, 123 include interfaces 154a, 154c, 154d, respectively, for communicating with a debugger client. The debugger client and the interfaces are described in more detail in a later section.

Embodiments of the present invention include a unifying process 142 for mitigating communications among the debugger client 102 and the virtual machines 121, 122, 123. The unifying process includes an interface 152b and an interface 154b. Hereinafter the interfaces 152a, 152b are collectively referenced as interface 152, and interfaces 154a, 154b, 154c, 154d are collectively referenced as interface 154. The unifying process is described in more detail in a later section.

Debugging Overview

When the program is debugged, a virtual machine 121 that interprets coded instruction modules of the stored modules 130 is run in a debug mode. When running in a debug mode, the virtual machine 121 interacts with the debugger client 102 on the debugger client host 104. The debugger client 102 typically includes a user interface (not shown) that displays information about the program that is being debugged and provides controls for a user to control the execution of the program. For example, the user may specify, through the controls provided by the user interface of the debugger, one or more breakpoints. A breakpoint identifies a location within the program at which execution should halt. Halting a program at a breakpoint gives the user time to inspect the debug information at that particular point of execution. The user typically specifies a breakpoint by selecting an instruction in the high-level language code that was used to generate the program. The execution of the program halts after executing the lower-language code that corresponds to the selected higher-language instruction.

As a more specific example, the user is prompted to specify one or more Java statements to serve as execution breakpoints and to specify one or more Java objects or attributes whose contents are of interest. The debugger client 102 sends messages to the virtual machine 121. The commands include the information to control execution of the modules, such as the breakpoints and memory locations of interest. The virtual machine 121 executes the coded instructions of one or more modules until a breakpoint is reached. The virtual machine 121 reports that the breakpoint is reached in a message containing debugging information to the client 102. If the user has not already done so, the user then specifies a next debugging operation to perform, such as executing the next statement in the program, or reporting the contents of one or more memory locations of the virtual machine 121. The virtual machine 121 retrieves the contents of the specified memory locations at that stage of execution, and sends a report message including more debugging information back to the debugger client 102. The debugging information includes the memory contents. The debugger client 102 presents the results, usually in association with the instruction in the high-level language that corresponds to the breakpoint.

As used herein, debugging information is information based on data provided by one or more virtual machines, which is utilized by a user of client 102 to assess the performance of a computer program. Debugging information includes, for example, contents of memory locations at a particular stage of execution, a call stack of virtual machines or routines that have been invoked but not yet ended at the particular stage of execution, lists of objects associated with one or more routines or virtual machines, tracing information, and time profile information, among others. Tracing information describes which groups of one or more instructions are executed. The groups may be modules or routines, for example. Time profile information describes execution time consumed by groups of one or more executed instructions.

The debugger client often provides the user with information about the call stack of the virtual machine, which provides context for the state of the program execution at the time the breakpoint is encountered. A call stack is often presented as a series of frames representing calls to routines that have not yet returned. The frames are positioned in the stack in order of execution. A frame in the stack is often expressed by the statement in the high-level language that calls the routine or the name of the routine. The stack helps a user to identify where in the execution of the program the current memory contents occur.

Inter-Component Communications

The debugger client 102 and virtual machine 121 are designed to exchange commands and responses through interface 152a on the debugger and complementary interface 154a on the virtual machine. Any manner known in the art for an interface may be employed. In some embodiments, an interface is a specified set of procedure calls that include specification of a procedure name, and specification of number and types of parameters passed to the procedure and returned from the procedure. In such embodiments, the debugger client typically is executed on the same host as the virtual machine rather than on different host as depicted in FIG. 1. The set of procedures that can be invoked in the virtual machine make up the virtual machine interface 154a, and the set of procedures that can be invoked in the debugger client make up the debugger client interface 152a.

In some embodiments, an interface is a protocol for exchanging debugging information using data packets transmitted over a network. For example, for a Java virtual machine, the Java Debug Wire Protocol (JDWP) has been defined for exchanging debugging information between processes. JDWP may be used to transmit debugging information over the Transport Control Protocol of the Internet Protocol (TCP/IP), or over any other network protocol, or through pipes or shared memory. JDWP may also be used to pass information between parts of the same process using memory-based mechanisms. At the time of this writing, JDWP is described in file jdwp-spec.html on directory j2se/1.3/docs/guide/jpda at Internet domain java.sun.com. Such protocols allow the debugger client 102 to reside on a different host 104 from the host 110 where the virtual machine 121 that is executing the module being debugged resides. In this case, the virtual machine interface 154a represents procedures that process the types of information passed to the virtual machine according to the protocol, and procedures that produce messages for the debugger client according to the protocol. Similarly, the debugger client interface 152a represents procedures that process the types of information passed to the debugger client according to the protocol, and procedures that produce messages for the virtual machine according to the protocol.

The Unifier Process

According to embodiments of the invention, a unifying process 142 is interposed between the debugger client 102 and the virtual machine 121. To the debugger client 102, the unifying process 142 appears to be a virtual machine by virtue of the virtual machine interface 154b. To the virtual machine 121, the unifying process 142 appears to be a debugger client by virtue of the debugger client interface 152b. The unifying process 142 produces integrated debugging information for presentation at the debugger client 102, no matter which virtual machines execute different modules of the program, as described in more detail in a later section. Although shown as a separate process in FIG. 1, in some embodiments the unifying process 142 is merely a component of one or more of the other processes, such as the processes that implement the debugger client 102, the virtual machine 121, a development editor (not shown) or a database server (not shown).

Also shown in FIG. 1, are a second virtual machine 122 with a virtual machine interface 154c and a third virtual machine 123 with a virtual machine interface 154d. Depending on the nature of the application being executed, the second and third virtual machines may execute at overlapping times relative to the first virtual machine 121.

For example, a Java module executing on a first Java virtual machine may invoke a procedure from a second Java module that may be executed by a second instance of the Java virtual machine on a second host. After control returns from the called procedure of the second module, the first Java module may then invoke the same or a different procedure that starts a third instance of the Java virtual machine. On a host with multiple processors, the two or three Java virtual machines might execute on separate processors of the same host. On some hosts, multiprocessing is performed by sharing time on the same one or more processors. If the calling module waits for the response from the called module before proceeding, the call is said to be synchronous. The unifying process is configured to provide debugging information with respect to a single stack of frames for all modules involved in a series of synchronous calls. In some embodiments, the unifying process is also configured, to provide debugging information as separate stacks ("threads") for any part of the program invoked by asynchronous calls.

In another example, different virtual machines are executed to interpret modules in different languages that produce different types of coded instructions. For example, a Java procedure invoked from a database may include an SQL statement. The Java virtual machine is executing to interpret the JVM coded instructions (bytecode). To interpret the embedded SQL statement, an SQL virtual machine is executed. The SQL statement may include an operation that triggers a procedure call for a module written in PL/SQL; so a PL/SQL virtual machine is executed to interpret the PL/SQL statements of the PL/SQL module.

According to embodiments of the invention, the second and third virtual machines, 122, 123 communicate with the unifying process 142, as does the first virtual machine 121. In FIG. 1 the three virtual machines communicate with the unifying process 142 through the same debugger client interface 152b of the unifying process, as described in more detail below. In other embodiments, the virtual machines of different languages communicate through different debugger client interfaces. Although three virtual machines are depicted exchanging debugging information with the unifying process in FIG. 1, in other embodiments, the unifying process 142 may exchange debugging information with more or fewer virtual machines.

Although the virtual machines 121, 122, 123 are shown executing on the program hosts 110, in other embodiments, one or more of the virtual machines can execute instead on any host that includes either direct or remote access to an appropriate subset of the modules 130 to be executed by the virtual machine.

Furthermore, although the unifying process 142 is depicted in FIG. 1 as residing on the same hosts where the virtual machines reside, embodiments that use a network protocol for the interfaces allow the unifying process to reside on any host on the network.

Debugging with Multiple Instances of the Same Virtual Machine

To illustrate the behavior of the unifying process with multiple instances of the same virtual machine, it is assumed that the modules 130 for the program are distributed over several program hosts. It is further assumed that the first virtual machine 121 is a first instance of a virtual machine, such as a JVM, that executes on a first program host, and that the second virtual machine 122 is a second instance of the same virtual machine, such as another JVM, that executes on a second program host.

Figure 2:
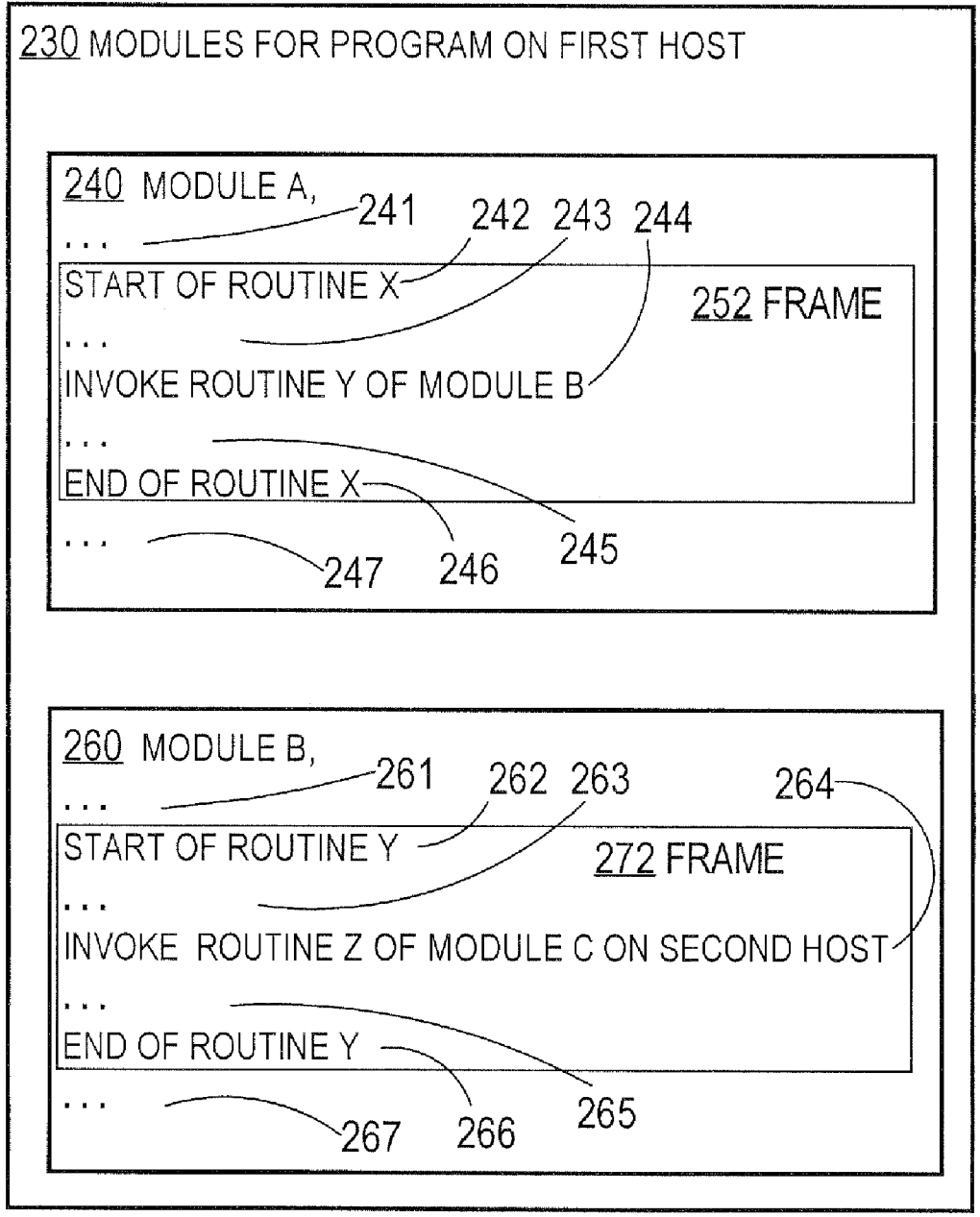
FIG. 2 is a block diagram illustrating program modules on a first program host, according to an embodiment.

FIG. 2 is a block diagram illustrating program modules 230 on the first program host, according to an embodiment. The modules 230 include modules of coded instructions based on an A module 240 and a B module 260 of statements in the same high-level language. For example, the modules 230 include Java classfiles of Java bytecode based on an A module 240 of statements in the Java language and a B module 260 of statements in the Java language.

Any method may be used to associate high-level language statements depicted in FIG. 2, with the coded instructions actually interpreted by the virtual machine. In some embodiments, the coded instructions are determined from the source code by compiling just before the virtual machine executes the coded instructions. In other embodiments, the high-level language statements are compiled into coded instructions ahead of time, but pointers relate coded instructions to the associated high-level language statement.

The A module 240 includes statements 242, 243, 244, 245, 246 in the high-level language that define a routine X. The A module 240 may also include other statements represented by the ellipses 241, 247 that are not relevant to illustrating an embodiment of the invention.

The B module 260 includes statements 262, 263, 264, 265, 266 in the high-level language that defines a routine Y. The B module 260 may also include other statements represented by the ellipses 261, 267 that are not relevant to illustrating an embodiment of the invention.

In the illustrated embodiment, the routine X starts in statement 242, includes other statements represented by the ellipsis 243, and then includes a statement 244 to invoke routine Y of the B module. For example, a Java statement to invoke a routine Y (a Java static method) in a Java class named "ClassQ" in the B package could be of the form:

B.ClassQ.Y( ), where the empty parentheses indicate that no parameters are passed to this particular routine. Routine X continues with other statements represented by the ellipsis 245. Routine X ends with statement 246, which causes the virtual machine to return control to whatever entity invoked the routine X.

In the illustrated embodiment, the routine Y starts in statement 262, includes other statements represented by the ellipsis 263, and then includes a statement 264 to invoke routine Z of a C module on another host. Routine Y continues with other statements represented by the ellipsis 265. Routine Y ends with statement 266, which causes the virtual machine to return control to whatever routine called routine Y. For example, when routine X invokes the routine Y, control is returned to routine X after the virtual machine executes all the statements in routine Y. Invoking a routine in the module C on a remote host involves communication from the first virtual machine 121 that executes the coded instructions for the A module and the B module to the second virtual machine 122 on the remote host that executes the coded instructions for the C module. Any method known in the art to provide the information and establish the connection may be used.

FIG. 2 also illustrates frames. A frame is a level of execution within a program. A frame is added to a stack of frames whenever an instruction that invokes another routine is executed by a virtual machine. A frame is removed from a stack when the routine returns control to the calling program. For example, frame 252 is formed when Routine X is executed, and Frame 272 is formed when Routine Y is executed. Frame 272 is removed when the statement 266 that ends routine Y is executed, and frame 252 is removed when the statement that ends routine X is executed. If a routine is called recursively, that routine may form several frames during execution.

Figure 3:
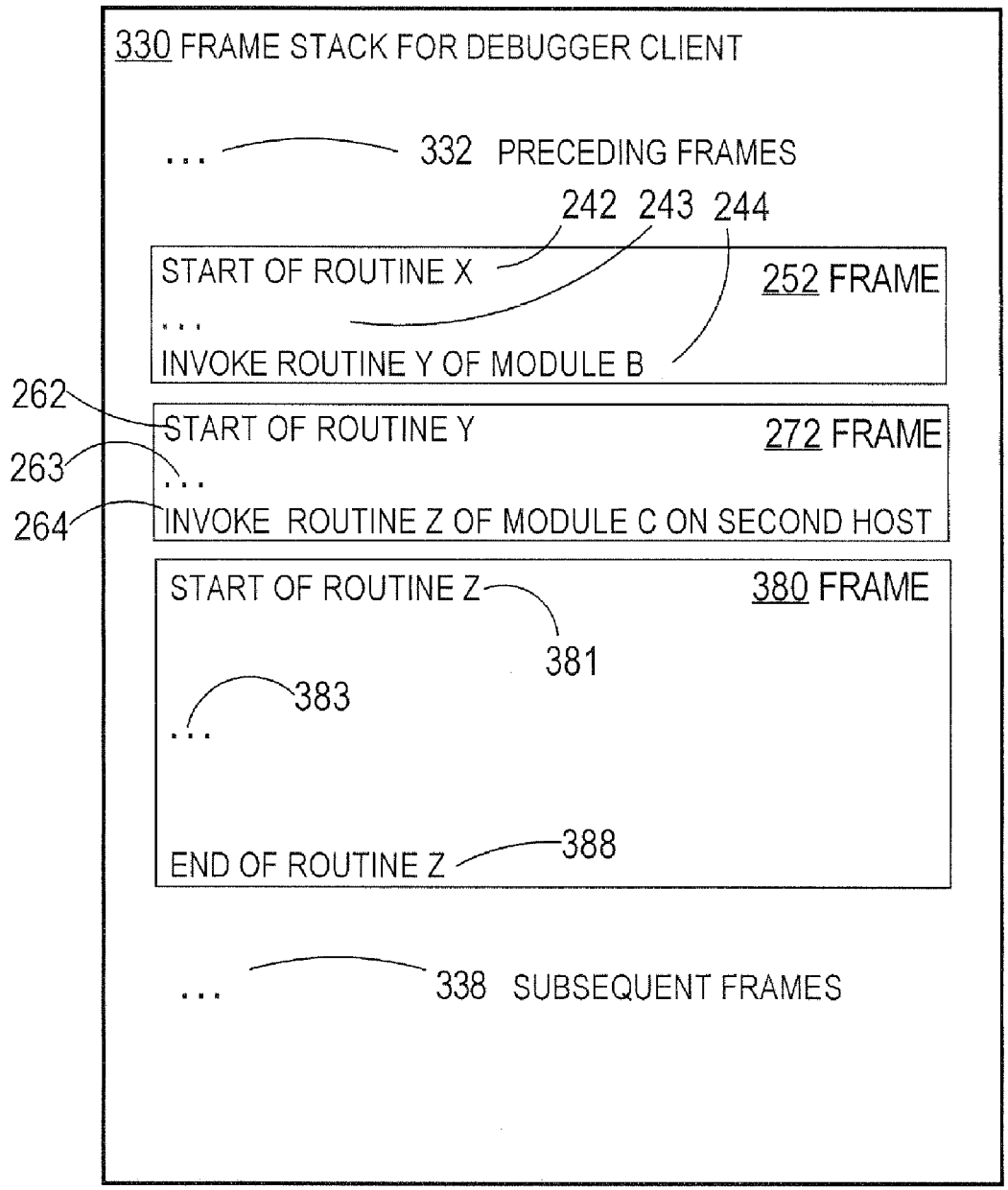
FIG. 3 is a block diagram illustrating a stack of frames associated with routines having instructions corresponding to the program modules of FIG. 2, according to an embodiment.

FIG. 3 is a block diagram illustrating a stack 330, desired by a user, for a breakpoint encountered while routine Z is executing. To demonstrate the state of execution while routine Z is executing, all the statements of the routines that have been executed are shown in each frame in FIG. 3. However, the frame is usually specified simply by the name of the routine whose invocation created the frame on the stack, not by the complete listing of statements in the routine. Thus Frame 252 is usually specified as the frame representing the call to Routine X. The frame information usually includes not only the name of the routine invoked but also the position in the invoking routine where the invocation is made. Such a position is the "current position" in the invoking routine. The current position can be specified in any manner known in the art. For example, in one embodiment, a program counter specifies the position. In another embodiment, a statement number specifies the current position.

The stack 330 includes frames 252, 272 representing invocations of routines X and Y, respectively, from the modules on the first host and includes a frame 380 representing the invocation of routine Z of module C on the second host. Ellipsis 332 represents frames for routines executed before routine X is invoked. Frame 380 represents routine Z having statements 381, 383, 388 in the high-level language that have been executed before the breakpoint. The routine Z starts in statement 381, includes other statements represented by the ellipsis 383, and ends at the last statement 388. For purposes of illustration, it is assumed that the breakpoint was selected after the last statement 388, just before exit of routine Z. Therefore frame 380 is the last frame in the stack. In embodiments in which the breakpoint is in another routine invoked directly or indirectly by Routine Z, subsequent frames, represented by ellipsis 338, follow frame 380.

Unified stack 330 represents call information in a manner consistent with how users think about the program that is being debugged. Specifically, users typically consider the program as a single process involving a sequence of calls, not as a complex web of interactions between disparate modules executing in separate processes. Using the unified stack 330, a user can easily determine the contents of variables in routines X, Y, and Z at the stage when the breakpoint statement is executed. The user can also set the contents of those variables to different values.

However, using conventional virtual machines 121, 122, and a single debugger client 102 without a unifying process 142, the frame 380 of instructions executed on the remote host would not be displayed after frames 252 and 272 by the debugger client 102 communicating with the first virtual machine 121. The user would not be able to use debugger client 102 for setting or reporting contents of variables in Routine Z associated with frame 380. Instead, the user would ordinarily execute a second debugger client (not shown) that communicates with the second virtual machine 122. Frame 380 may then be indicated in a graphical user interface of the second debugger client. The user would have to switch back and forth between the first debugger client 102 and the second debugger client to debug across the boundary between routine Y and routine Z. Such switching is slow and tedious and increases the risk the user may make an error in trying to debug the program. In addition, when the two modules are separately debugged, the sequential relationship of the calls made between the modules is not made explicit by either debugger client.

According to embodiments of the invention, the unifying process 142 is interposed between the debugger client and the virtual machines. The unifying process 142 manages debugging information related to the frames of the stacks associated with multiple virtual machines, and the unifying process interleaves the information to reference a single stack that is presented to the user at a single debugger client. For example, the unifying process 142 manages debugging information for frames 252, 272, associated with coded instructions interpreted by the first virtual machine 121, and manages debugging information for frame 380 associated with coded instructions interpreted by the second virtual machine 122. The unifying process interleaves this information to build the unified stack 330 of frames as shown in FIG. 3; and sends the interleaved debugging information to the debugger client. The debugger client presents the debugging information to the user in the context of the unified stack of FIG. 3. Various techniques that may be used by the unifying process to construct the unified stack are described in greater detail hereafter.

Debugging Multiple Languages

To illustrate the behavior of the unifying process when different types of virtual machines are involved (e.g. the program being debugged involves modules written in multiple languages), it is assumed that the modules 130 for the program are modules of coded instructions for different virtual machines based on modules in different high-level languages. It is further assumed that the first virtual machine 121 is a JVM, that the second virtual machine 122 is an SQL virtual machine, and that the third virtual machine is a PL/SQL virtual machine.

Figure 4:
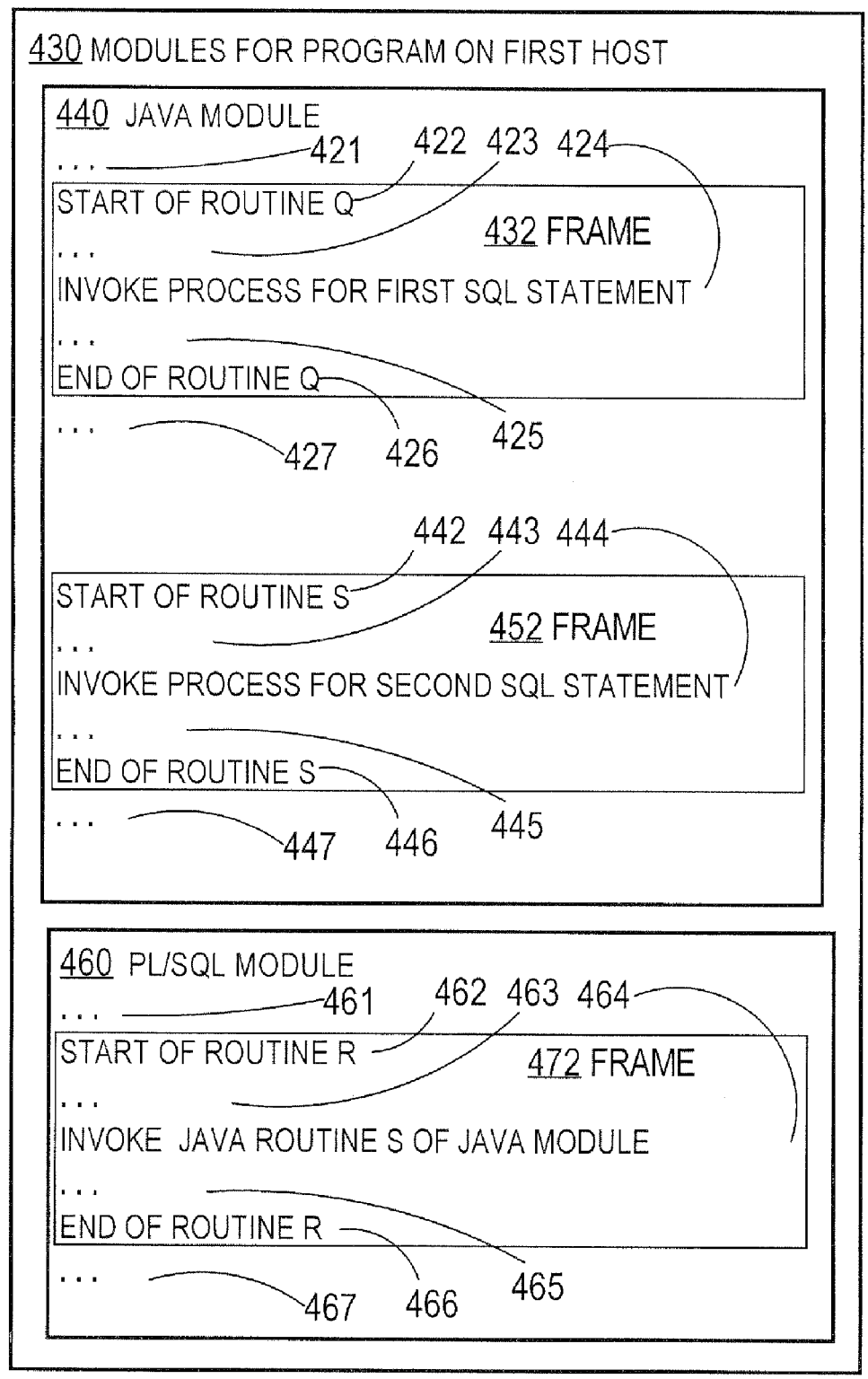
FIG. 4 is a block diagram illustrating multiple language modules for a program on a first program host, according to an embodiment.

FIG. 4 is a block diagram illustrating multiple language modules for a program on a first program host, according to an embodiment. The Java module 440 includes statements 422, 423, 424, 425, 426 in the Java language that define a routine Q. The Java module 440 also includes statements 442, 443, 444, 445, 446 in the Java language that define a routine S. The Java module 440 may also include other statements, represented by the ellipses 421, 427, 447, that are not relevant to illustrating an embodiment of the invention. The PL/SQL module 460 includes statements 462, 463, 464, 465, 466 in the PL/SQL language that define a routine R. The PL/SQL module 460 may also include other statements represented by the ellipses 461, 467 that are not relevant to illustrating an embodiment of the invention.

As has been stated for FIG. 2, any method may be used to associate high-level language statements depicted in FIG. 4, with the coded instructions actually interpreted by the virtual machine.

In the illustrated embodiment, the Java routine Q starts in statement 422, includes other statements represented by the ellipsis 423, and then includes a statement 424 that involves interaction with a SQL server. A standard interface called a Java database connection (JDBC), well known in the art, is used to interact with the SQL server. For example, statement 424 is a call to a JDBC routine to execute an SQL query for retrieving data from the database, and would be of the form:

. . . executeQuery ("SQL query");

Typically many other Java statements are also involved to define variables for exchanging information with the SQL server, for dealing with error conditions that may arise, among other actions; but these additional statements are not used to illustrate this embodiment.

The Java routine Q continues with other statements represented by the ellipsis 425. Routine Q ends with statement 426, which causes the JVM to return control to whatever entity invoked the routine Q. Similarly, the routine S starts in statement 442, includes other statements represented by the ellipsis 443, and then includes a statement 444 involved in submitting a second SQL statement to a SQL server. For example, statement 444 is a call to a JDBC routine to prepare another SQL "SELECT" command to a database server to retrieve data from the database. The routine S continues with other statements represented by the ellipsis 445. Routine S ends with statement 446, which causes the JVM to return control to whatever entity invoked the routine S.

The PL/SQL routine R starts in statement 462, includes other statements represented by the ellipsis 463, and then includes a statement 464 that invokes the Java routine S. For example, statement 464 is of the form:

x :=S(v);

The routine R continues with other statements represented by the ellipsis 465. Routine R ends with statement 466, which causes the PL/SQL virtual machine to return control to whatever entity invoked the routine R.

In the illustrated embodiment, frame 432 represents routine Q which starts at a first statement 422 in the routine Q and ends at the last statement 426 of routine Q. Frame 452 represents routine S which starts at a first statement 442 in the routine S and ends at the last statement 446 of routine S. Frame 472 represents routine R which starts at a first statement 462 in the routine R and ends at the last statement 466 of routine R. Other statements are represented by ellipses 423, 425, 443, 445, 463, 465.

Figure 5:
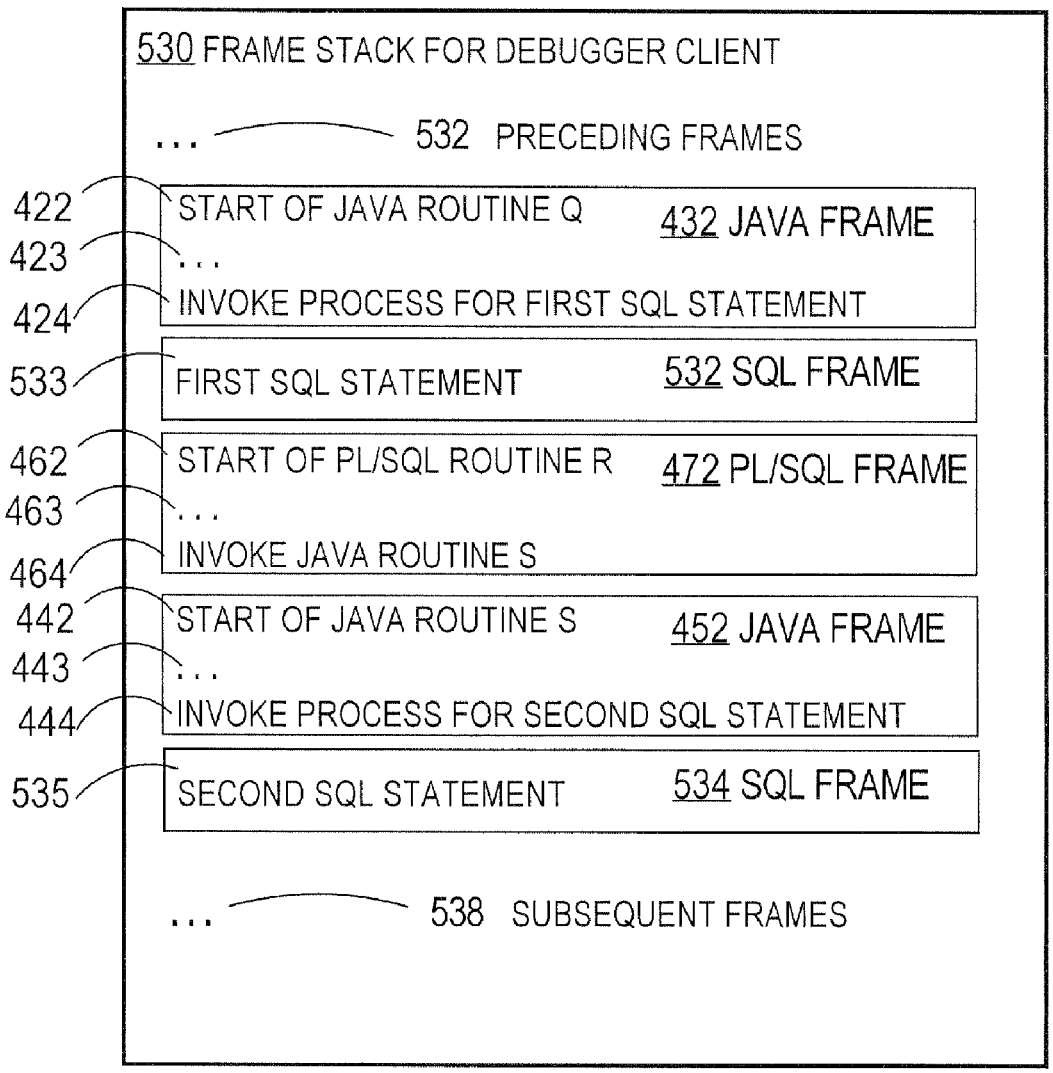
FIG. 5 is a block diagram illustrating a stack of frames associated with routines having instructions corresponding to the multiple language modules of FIG. 5, according to an embodiment.

When a user wishes to debug a program made up of Java modules and PL/SQL modules, the user would like to see the state of execution of all modules when the breakpoint is reached. FIG. 5 is a block diagram illustrating a stack 530, desired by a user, which includes frames from all the modules executed, regardless of the language, and the virtual machine, executing the modules.

The stack 530 includes Java frames 432, 452 from the Java module 440 and PL/SQL frame 472 from the PL/SQL module 460. The stack 530 also includes frames 532, 534 for the SQL statements 533, 535, respectively, executed by the SQL virtual machine 122 of the database server.

The frame stack 530 of FIG. 3 is useful at a single debugger client because it shows the sequence of frames representing routines in the order executed. Ellipsis 532 represents frames associated with routines executed before routine Q is invoked. The routine in the frame immediately preceding frame 432 includes a statement that causes routine Q to be invoked. The stack 530 next includes Java frame 432 representing execution of the Java statements 422, 423, 424 of routine Q up to the statement 424 invoking the process to execute the first SQL statement. The bytecode compiled from statements in the Java frame 432 is executed by the JVM 121.

The stack 530 next includes SQL frame 532 representing the first SQL statement 533, which is being executed by an SQL virtual machine 122, not the Java virtual machine 121. In some embodiments, the SQL statement 533 is compiled into coded instructions having one or more basic SQL operations before being executed by the SQL virtual machine. For purposes of illustration, it is assumed that the execution of the SQL statement 533 triggers the execution of the PL/SQL routine R by a PL/SQL virtual machine 123.

The stack 530 next includes PL/SQL frame 472 representing the executed statements 462, 463, 464 of PL/SQL routine R up to the invocation of the Java routine S. The coded instructions compiled from statements in the routine R are executed by the PL/SQL virtual machine 123.

The stack 530 next includes Java frame 452 representing the executed Java statements 442, 443, 444 of routine S up to the statement 444 invoking the process to execute the second SQL statement. The bytecode compiled from statements in the Java frame 452 is executed by the JVM 121.

The stack 530 next includes SQL frame 534 representing the second SQL statement 535, which is being executed by an SQL virtual machine 122, not by the JVM 121 For purposes of illustration, it is assumed that the second SQL statement is the breakpoint so that no further frames are on the stack. Ellipsis 538 represents subsequent frames that would appear on the stack if the breakpoint were in another routine directly or indirectly invoked as a result of executing the second SQL statement.

Using the unified stack 530, a user can easily determine the contents of variables in routines Q, R, S and in the first and second SQL statements at the time the breakpoint statement is executed. The user can also set the contents of those variables to different values. The user can also cause one of the virtual machines to execute the next instruction in the program.

However, using conventional virtual machines 121, 122, 123 and a single debugger client 102 without a unifying process 142, the frames of instructions executed on the SQL and PL/SQL virtual machines 122, 123 would not be displayed among Java frames 432, 452 by the debugger client 102 communicating with the JVM 121. The user would not be able to use debugger client 102 to get or set values for variables within frames 532, 472, 534. To set breakpoints and to set and report variable contents in the SQL and PL/SQL routines, the user would ordinarily execute a second debugger client (not shown) that communicates with the SQL virtual machine 122 and a third debugger (not shown) that communicates with the PL/SQL virtual machine. The SQL frames may then be represented in a graphical user interface of the second debugger client. The PL/SQL frames may then be represented in a graphical user interface of the third debugger client. The user would switch back and forth among the first debugger client 102, the second debugger client and the third debugger client to debug across the boundaries between routines of the three different languages. Such switching is slow and tedious and increases the risk the user may make an error in trying to debug the program. Furthermore, none of the debugger clients explicitly indicate the relative sequence of the frames among the three stacks.

According to embodiments of the invention, the unifying process 142 is interposed between a single debugger client and the virtual machines of multiple languages, as in embodiments with multiple instances of the same virtual machine. The unifying process 142 manages debugging information related to the frames of the stacks associated with multiple virtual machines for multiple languages, and the unifying process interleaves the information to reference a single stack that is presented to the user at a single debugger client. For example, the unifying process 142 manages debugging information for Java frames 432, 452 associated with bytecode interpreted by the JVM 121. The unifying process 142 manages debugging information for SQL frames 532, 534 associated with coded instructions interpreted by the SQL virtual machine 122. The unifying process 142 manages debugging information for PL/SQL frame 472 associated with coded instructions interpreted by the PL/SQL virtual machine 123. The unifying process interleaves this information to reference the stack 530 of frames as shown in FIG. 5; and sends the interleaved debugging information to a single debugger client 102. The debugger client 102 presents the debugging information to the user in the context of the unified stack of FIG. 5.

The unifying process uses an interface for a single language to exchange information with the debugger client. Thus, the unifying process appears to the debugger client to be a single virtual machine that interprets the coded instructions of all languages. For example, the unifying process 142 uses JDWP for data exchanges with the debugger client process 102; and, the unifying process 142 appears to the debugger client 102 to be a JVM that interprets the coded instructions from Java, SQL and PL/SQL modules.

Methods Performed by the Unifying Process

According to embodiments of the invention, the unifying process performs the methods illustrated in FIG. 6A, FIG. 6B, FIG. 6C and FIG. 6D to interleave debugging information from multiple virtual machines for multiple languages. Although steps are illustrated in these figures and subsequent flowcharts in a particular order, in other embodiments, the steps may be executed in a different order or overlapping in time or omitted altogether.

Functional Overview.

Figure 6A:
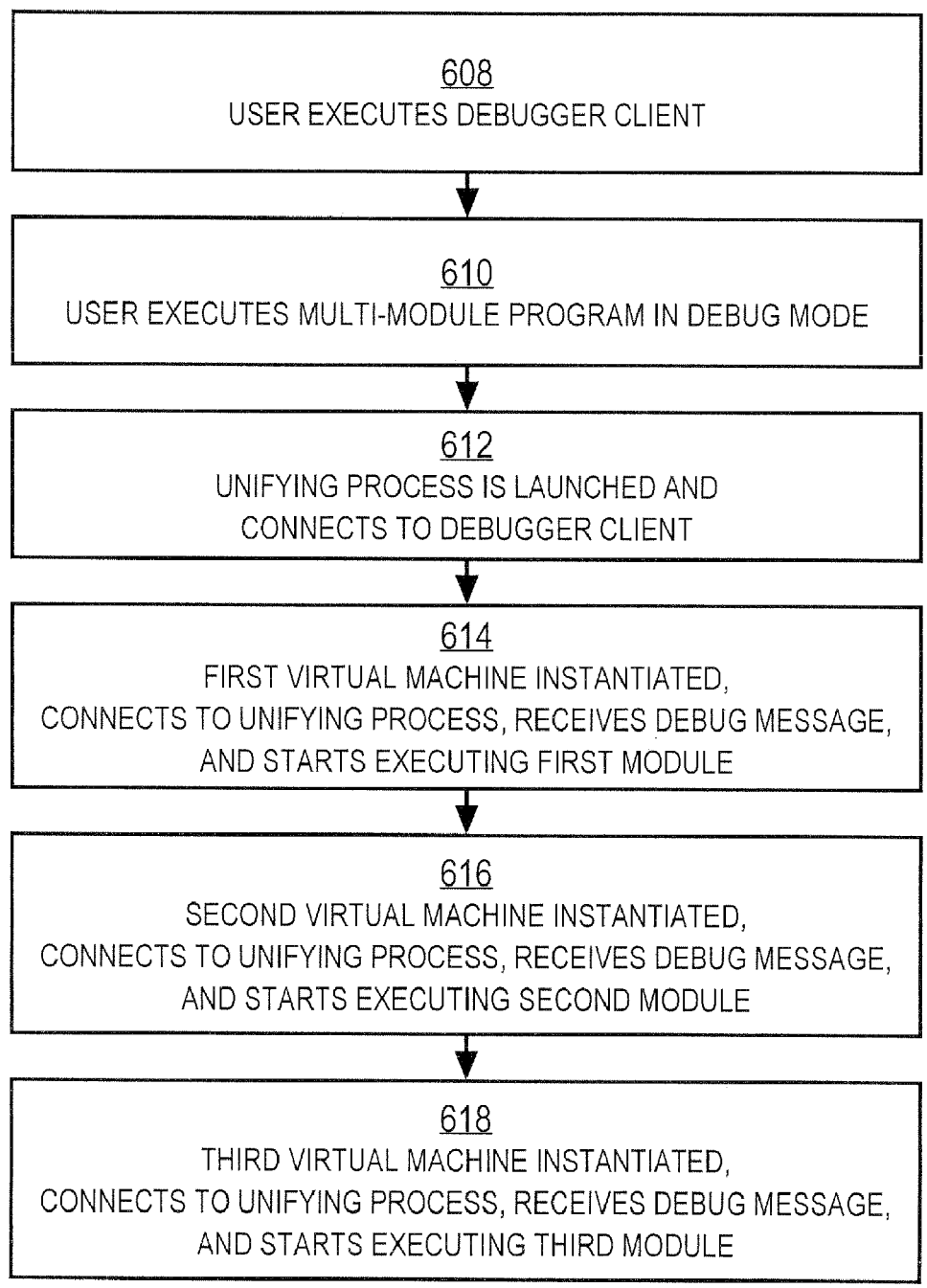
FIG. 6A is a flowchart illustrating at a high level a method for debugging a computer program having multiple modules executed by multiple virtual machines according to an embodiment.

FIG. 6A is a flowchart illustrating at a high level a method for debugging a computer program having multiple modules executed by multiple virtual machines according to an embodiment. In step 608 a user executes a debugger client to provide controls for the user to manage the debugging operations and to present debugging context and results to the user. For example, the user executes debugger client 102 on the user's workstation, which is the host 104. Any debugger client may be used.

In step 610 the user executes the multi-module program in debug mode. Each virtual machine is configured to exchange information with a debugger client when executed in the debug mode. For example, a user establishes a connection to a database server to execute a multi-module program stored in the database. The connection setup includes data indicating that the particular debugger client 102 is running on the particular workstation 104 on the network. In some embodiments the user connects to a database server using a Web browser process (not shown) on the user's workstation 104. The Web browser is well known in the art of network communications and communicates according to the standard hypertext transfer protocol (HTTP). The debugger client process 102 is identified as a process listening on a particular port or socket on the host 104. In some embodiments, the debugger client is identified in one message to the database server from the browser and stored thereafter on the user's workstation 104 in a persistent file, called a cookie, as is well known in the art. In other embodiments, a database user may instead connect to the database server through any database-oriented protocol known in the art, such as JDBC, the Open Database Connectivity (ODBC), the Oracle Call Interface (OCI), the Universal Database Call Level Interface (CLI), among others. In some embodiments, an operating system environmental variable is set to indicate that the debugger client is waiting on the host 104 at a particular port. In some embodiments, the program code run in a virtual machine may also include statements that explicitly connect or disconnect the virtual machine from the debugger client.

In step 612 a unifying process is launched to mitigate between the debugger client 102 and one or more virtual machines that are instantiated to execute the multi-module program. Any manner known in the art to have virtual machines communicate with the unifying process and to have the unifying process communicate with the debugger client may be employed. For example, the database server or the operating system responds to a communication indicating the host address and port of the debugger client 102 by launching the unifying process on a particular host to respond to messages on one or more particular ports. Steps to launch the unifying process include passing to the unifying process the host and port of the debugger client 102. After launching the unifying process, the database server or operating system that instantiates a virtual machine directs each virtual machine instantiated to send debugging information to the unifying process. For example, the cookie or the operating system environmental variable is reset to indicate the host and a port of the unifying process. The unifying process may alternatively be embedded as part of a database server or other program which contains one or more virtual machines, communicating with the virtual machines in that program through a function call application programming interface (API) or through messages passed in program memory.

In step 614, a virtual machine is instantiated to execute coded instructions of a module of the program. The virtual machine is instantiated in debug mode with the host and port of the unifying process as the recipient of debug messages generated by the virtual machine. Any method for executing a virtual machine in debug mode may be employed. To determine any breakpoints for executing in the debug mode, the virtual machine connects to the unifying process to receive debugging request information in one or more messages. For example, debugging request information includes the breakpoints where execution is to be suspended. Also, the debugging request information may include the identification of each requested variable object (variable object ID) whose contents are to be provided at the breakpoint. The virtual machine receives debugging request messages, which may also be called debug requests, with the debugging request information such as the breakpoints. The virtual machine executes up to the breakpoint, invoking routines in other modules as indicated by the coded instructions in the module being executed. If a breakpoint is reached, execution is suspended. A user may then send debug requests for one or more variable objects. The contents of the requested variable objects are sent to the unifying process in debugging information from the virtual machines, either automatically or upon a specific request from the unifying process.

If the virtual machine invokes a routine in a module executed by another virtual machine, the other virtual machine is instantiated, as shown in step 616. If this routine causes invocation of another routine that is executed by a third virtual machine, the third virtual machine is instantiated in step 618. When each virtual machine is instantiated in steps 616 and 618, the virtual machine connects with the unifying process, receives any debug requests, and starts executing the invoked routine in the module the virtual machine is executing until a breakpoint is reached. Although FIG. 6A shows three virtual machines are instantiated, in other embodiments more or fewer virtual machines are instantiated.

Messages from Debugger Client.

FIG. 6B is a flowchart illustrating an embodiment 620 of a method at a unifying process for debugging a computer program executed by multiple virtual machines based on a message from a debugger client.

In step 623, a debugging message is received at the unifying process from a debugger client. The message includes one or more operations, breakpoints or variable objects. The breakpoints are indicated by module identifiers and position indicators, such as module names and statement line numbers. It is assumed, for purposes of illustration, that module 440 is named "AtoQS" and that statement 444 occurs at a line number having a value "444." For example, to set a breakpoint at statement 444 of Java module 440 in FIG. 4, the debug message includes data indicating "set breakpoint" and "AtoQS" and "line=444." If the method is used recursively, a sequence number can be added to the module identifier. In some embodiments (such as embodiment using JDBWP to pass request information and debugging information) routines, variable objects and even frames are identified by one or more unique integers generated by the system, rather than by names.

The variable objects are indicated by an object ID, such as a module name, a routine name, and an object name or by a unique integer or set of integers. For example, it is assumed for illustration that statement 444 includes an SQL clause "where T.CityName=FirstCity" in which CityName is a column in table T of the database and FirstCity is a variable whose value is set sometime during execution of the coded instructions associated with the modules 440 and 460. It is assumed for illustration that the variable FirstCity is a user-define object including a city name, a province name, and a country name. It is assumed further that FirstCity is defined as a private variable in the routine S of Java module 440. To indicate the object ID of the variable FirstCity, it is specified by its module, routine and name, "AtoQS.S.FirstCity." Thus, to set a value for the variable at a breakpoint at statement 444, the debug request message includes data indicating the operation "set variable value on entry," the breakpoint "AtoQS, line=444," the variable "AtoQS.S.FirstCity" and the value "Rome, N.Y., USA." In an alternative embodiment, a first request message sets the breakpoint, and a second request message specifies the variable after the client is notified that the breakpoint has been reached. To get a value for the variable at a breakpoint at statement 444, the debug request message includes data indicating the operation "get variable value on entry," the breakpoint "AtoQS, line=444" and the variable "AtoQS.S.FirstCity."

In other examples, the debug request message is a request to execute a single step, or a request to list all loaded classes, or a request to list the routines on the stack, or a request to list the IDs of the variable objects associated with each routine on the stack.

It is assumed that the debug request message received includes data indicating a first operation "get variable value on entry," the breakpoint "AtoQS, line=444" and the variable "AtoQS.S.FirstCity," and a second operation "get variable value on SQL exit," the breakpoint "AtoQS, line=444," and the variable "SQL.FirstCity." With these two breakpoints a user can determine whether the value of the variable FirstCity changed from the time the SQL statement was submitted from the Java routine S until the time the SQL statement was executed by the SQL virtual machine.

In step 624, the unifying process determines the breakpoints or variable object IDs within modules executed by a "current" virtual machine of the multiple virtual machines. For purposes of illustration, it is assumed that program execution has already been halted at a breakpoint in routine R in the PL/SQL module being executed by the third virtual machine 123. Routine R is triggered upon execution of the first SQL statement executed by the second virtual machine 122. The first SQL statement is submitted by statement 424 of the routine Q being executed by the first virtual machine 121. Thus, the first, second and third virtual machines have been instantiated at the time step 624 is performed in this example. One of the three virtual machines is made the current virtual machine and it is determined whether any breakpoints and variable object IDs are associated with that virtual machine.

In the illustrated embodiment, the first virtual machine is the JVM, which executes module 440. Module 440 has a breakpoint to be set at line 440 in the example data received in step 623. The second virtual machine is the SQL virtual machine and has a breakpoint upon exit of the submitted SQL statement in the example. The third virtual machine is the PL/SQL virtual machine, which does not have a breakpoint in the data received in step 623 in this example. For example, the JVM is made the current virtual machine, and it is determined that the operation "get variable value on entry," the breakpoint "AtoQS, line=444" and the variable "AtoQS.S.FirstCity," are to be included in a debug message for the current virtual machine.

In step 626, the breakpoints and variable object IDs are translated from constructs of the language used by the debugger client to constructs of the language used by the current virtual machine. This step is omitted in embodiments in which the current virtual machine is modified to do such a translation, as described in more detail below with respect to FIG. 7. This step is also omitted in embodiments in which the language used by the debugger client 102 is the language of the current virtual machine into which the breakpoint is submitted. This step is omitted in the example, because the debugger client is assumed to use the JDWP interface that employs Java constructs and the current virtual machine is the JVM that also uses Java constructs.

In step 628, a new debug message is generated for the current virtual machine. The new debug message includes only breakpoints in the modules executed by the current virtual machine and references breakpoints and variables using the language constructs of the current virtual machine. For example, a modified debug message is generated that includes only the operation "get variable value on entry," the breakpoint "AtoQS, line=444" and the variable "AtoQS.S-.FirstCity." In step 630, the modified debug request message is sent to the current virtual machine. For example, the modified debug request message is sent to the JVM 121.

In step 632, it is determined whether there is another virtual machine that has been instantiated. If so, control flows to step 634 to make another virtual machine the current virtual machine and return control to step 624.

For example, it is determined in step 632 that the SQL virtual machine 122 is also instantiated, so the SQL virtual machine is made the current virtual machine and control passes to steps 624 through 630 to generate and send a modified debug request message for the SQL virtual machine 122. In this example, a second modified debug request message is generated and sent to the SQL virtual machine 122. The second modified debug request message includes data indicating the operation "get variable value on SQL exit," the breakpoint "second SQL statement" and the variable "SQL-.FirstCity." In an illustrated embodiment no line numbers internal to an SQL statement are used as breakpoints, so that the only breakpoints are before entry and after exit from the SQL virtual machine.

After making the SQL virtual machine the current virtual machine, on the next performance of step 632, it is determined in step 632 that the PL/SQL virtual machine 123 is also instantiated, so the PL/SQL virtual machine is made the current virtual machine and control passes to steps 624 through 630 to generate and send a modified debug message for the PL/SQL virtual machine 123. In this example, it is determined that no breakpoints or variable objects are specified for the PL/SQL virtual machine 123. Thus, in this example, no modified debug request message is generated or sent to the PL/SQL virtual machine 123.

If it is determined in step 632 that there is no other virtual machines instantiated, processing of the debug message from the debugger client is complete, as indicated by the passing of control to step 635 to end the process.

Messages from Virtual Machines.

Figure 6D:
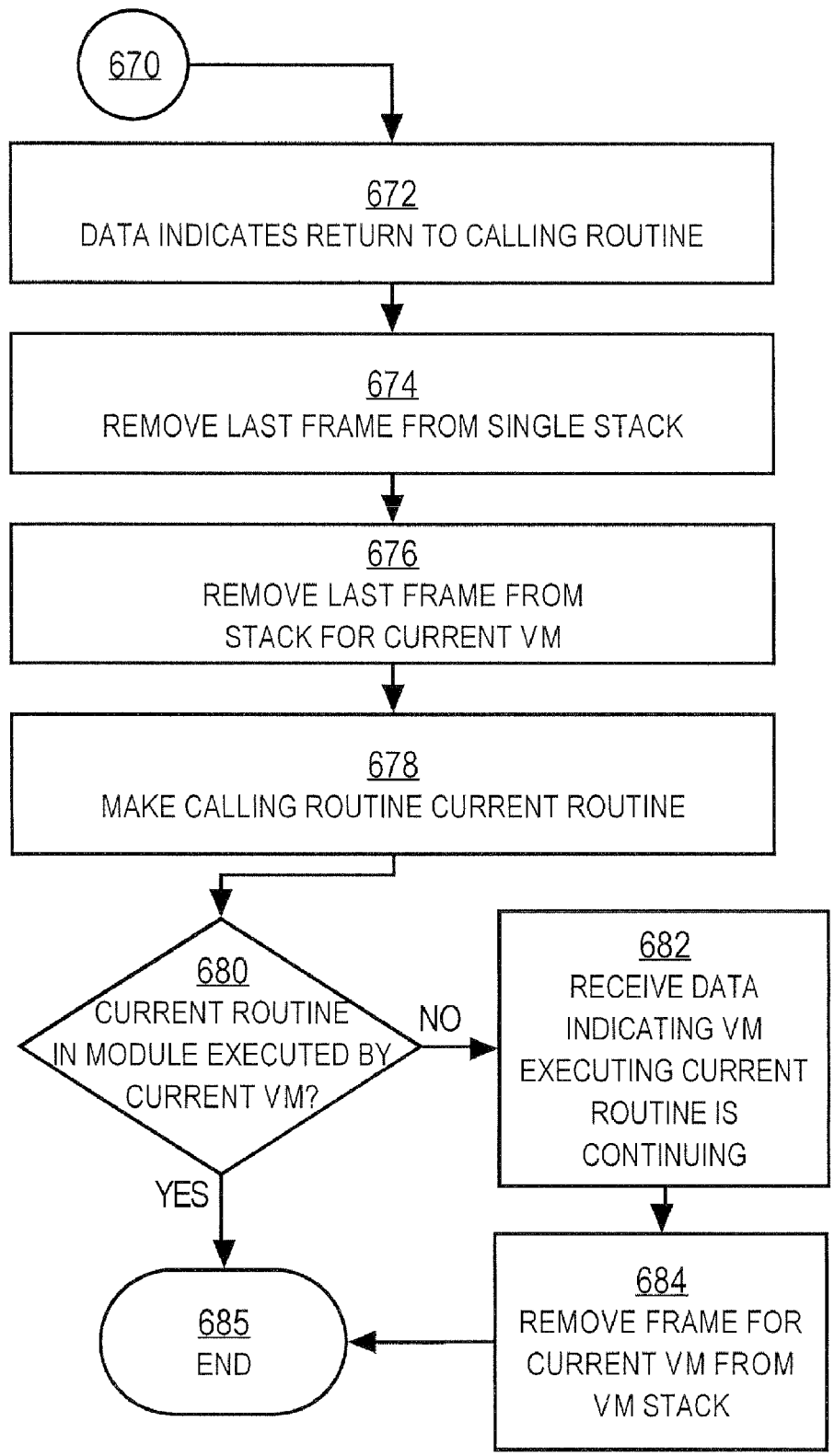

FIG. 6C and FIG. 6D make up a flowchart illustrating an embodiment 640 of a method at a unifying process for debugging a computer program executed by multiple virtual machines based on debugging information received from a virtual machine.

In step 641, a message is received from a virtual machine of the plurality of virtual machines with debugging information. The virtual machine that sends the message is a current virtual machine. The other instantiated virtual machines are waiting for the current virtual machine to finish processing and return control to one of the other virtual machines. The message may indicate the current virtual machine is completing execution of a routine, that the current virtual machine is beginning execution of a routine, that the current virtual machine has reached a breakpoint, or that the contents of one or more variable objects are being returned. In some embodiments, the data are expressed in the language constructs of a different language than is used by the debugger client 102. In such embodiments, step 641 includes steps to translate the constructs of the different language to the constructs of the language used by the debugger client 102. An example translation is described in more detail in a later section.

In step 642, it is determined whether the data indicates the current virtual machine is returning control to a calling routine that invoked the current routine. For example, the data indicates that the PL/SQL virtual machine 123 has completed execution of routine R and is returning control to routine Q that invoked routine R. If so, control passes to method 670 illustrated in FIG. 6D and described in more detail below with reference to FIG. 6D. If not, control passes to step 643.

In step 643, data indicating the next routine to be executed or the current values of variable objects in the calling routine are determined from the message received from the current virtual machine. In some embodiments the values of variable objects are indicated explicitly. In some embodiments, the data indicates only the object IDs of the variable objects for which values are maintained by the current virtual machine. The object ID may subsequently be used to retrieve the values of those objects from the virtual machine. The current values of some variable objects might not yet be defined.

In some embodiments in which each virtual machine maintains a call stack for its own routines, the debugging information may include the virtual machine's call stack and that call stack is determined in step 643.

For example, in step 643, data is obtained from a message from the JVM 121, which indicates the next routine to be executed is submission of the second SQL statement. The values of variable objects in routine S, that submits the second SQL statement, are also indicated. For example, the value of AtoQS.S.FirstCity is "Rome, N.Y., USA."

In step 644, it is determined whether the next routine is in a module executed by the current virtual machine. If so, control passes to step 650 to add a frame representing the next routine to a stack of frames associated with the current virtual machine. For example, if the next routine were a routine X also executed by the JVM, control would pass to step 650 to add a frame for routine X to a stack for the JVM 121. In some embodiments in which the virtual machine maintains its own call stack, step 650 may be omitted.

If, instead, the next routine is executed by a different "next" virtual machine, then control passes to step 646 to receive the data from the next virtual machine and to add a frame for the next virtual machine to a call stack of virtual machines maintained by the unifying process. The frame for the virtual machine also specifies the unique position of the call in the calling virtual machine. Control passes from step 646 to step 648 to make the next virtual machine the current virtual machine. Then control passes to step 650 to add a frame representing the next routine to the stack of frames associated with the current virtual machine. In the example, the current JVM executes the current routine S through the statement 444 that submits the second SQL statement. The second SQL statement is the next routine and is executed by the SQL virtual machine 122 different from the JVM 121. Control passes to step 646 to receive data from the SQL virtual machine 122 indicating that execution of the second SQL statement by the SQL virtual machine 122 is beginning and to add the SQL frame to the call stack. In step 648, the SQL virtual machine is made the current virtual machine. Control then passes to step 650 to add a frame for the second SQL statement to the stack for the SQL virtual machine.

In some embodiments, step 650 is omitted because the frame is automatically added to a stack for the current virtual machine by the virtual machine itself, and the unifying process can request the stack from the virtual machine whenever that information is to be used.

In step 652, the frame for the next routine is added to a single stack maintained by the unifying process for all the routines executed for the multi-module program. For example, SQL frame 534 is added to single frame stack 530. The single frame stack 530 includes, above the SQL frame 534, Java frame 452 for the Java routine S that submitted the second SQL statement. The single frame stack 530 includes, above the Java frame 452, a PL/SQL frame 472 for the PL/SQL Routine R that invoked the Java routine S. The single frame stack 530 includes, above the PL/SQL frame 472, a SQL frame 532 for the SQL statement that triggered the PL/SQL routine R. The single frame stack 530 includes, above the SQL frame 532, a Java frame 432 for the Java Routine Q that submitted the first SQL statement. None of the stacks maintained by the individual virtual machines include all these frames.

In step 652, the values of the requested variables in the current routine are associated with the frame. This can be performed in any manner. For example, in some embodiments, the frame of the single stack can be associated with a frame in a virtual machine that maintains the values of all variables for the routine. In some embodiments, the unifying process stores the variable object IDs and their values in association with the frame for all variable objects in the routine. In some embodiments, the unifying process stores only the values of the requested variable objects in the routine in association with the frame.

For example, the value of the variable object FirstCity when the SQL statement is entered is associated with the frame. For purposes of illustration, it is assumed that the value of the FirstCity variable object is "Rome, N.Y., USA" at the entry point. In the illustrated example, the value of the variable FirstCity in the SQL frame at the time of reaching the breakpoint of exiting the SQL statement execution is associated with the frame. For purposes of illustration, it is assumed that the value of the FirstCity variable object is "Rome, Latium, Italy" at the breakpoint.

Also in step 652, the next routine is made the current routine. For example, the second SQL statement is made the current routine.

In some embodiments that rely on the information maintained by the virtual machines, step 652 is omitted.

In step 654 it is determined whether the message is received while the current virtual machine is at a breakpoint. If not, processing of the message is complete as indicated by passing control to step 669 to end the process. For example, if the debug message is sent by the current virtual machine to indicate that the routine has started execution, but there is no breakpoint upon entry of the routine, control passes to step 669.

If it is determined in step 654 that the debug information indicates a breakpoint has been reached, control flows to step 656. In step 656, the unifying process receives data indicating values of variable objects in the current routine at the breakpoint. In some embodiments, the data is provided automatically by the current virtual machine for all routines in the stack of the current virtual machine. For example, the SQL virtual machine provides values for all variables associated with the first and second SQL statements in the stack of the SQL virtual machine. In some embodiments, some or all of the information is obtained from the current virtual machine by requesting values from the virtual machine. For example, the unifying process sends a message to the virtual machine requesting values for the requested variable objects from one or more of the routines in the stack maintained by the virtual machine. In some embodiments, the unifying process already stores some or all of the information as a result of step 652.

For example, the SQL virtual machine provides a value for the FirstCity variable object upon reaching the breakpoint. In the illustrated example, the value is "Rome, Latium, Italy."

In step 658, the unifying process assembles data indicating values for all requested variable objects associated with routines in the single stack. For example, it is assumed that the user has also requested the value of the variable string "MonthAveraged" determined during execution of PL/SQL routine R at the time of execution of the breakpoint. In step 658, the unifying process obtains the current value in the variable MonthAveraged associated with the stack for the PL/SQL virtual machine. In some embodiments, the value of MonthAveraged at the time of the break is obtained by requesting the value from the PL/SQL virtual machine 123. For example, the unifying process sends a message to the PL/SQL virtual machine requesting values for the MonthAveraged string from the stack maintained by the PL/SQL virtual machine 123. In the illustrated example, the value is assumed to be "February." In some embodiments, the unifying process already stores some or all of the information as a result of step 652.

For example, the unifying process finds the requested variable MonthAveraged in the single stack associated with the PL/SQL frame 472 and requests the value of the variable string MonthAveraged from the PL/SQL virtual machine 123. The PL/SQL virtual machine sends the value "February" in response. The unifying process then generates data indicating the value "Rome, Latium, Italy" for the variable, user-defined object FirstCity and the value "February" for the variable string MonthAveraged.

In some embodiment, in which the debugging information is obtained from the virtual machines, a check is made during step 658 to determine whether the debugging information has been received from all the virtual machines with requested data. If not, the unifying process ends for the processing of the message received in step 641, passing control to step 669. Essentially, the unifying process waits for additional messages with debugging information. If all the virtual machines with requested data have reported, control passes to step 660.

In embodiments in which the virtual machines provide debugging information in different formats, step 658 includes converting the format. For example, the format is converted to JDWP. In embodiments in which the virtual machines provide debugging information with different language constructs than used by the database client 102, step 658 includes using the mapping to generate debugging information in the constructs of the language used by the debugger client.

In step 660, the data generated in step 658 is sent to the debugger client. For example, the data indicating the value "Rome, Latium, Italy" for the variable, user-defined object FirstCity and the value "February" for the variable string MonthAveraged is sent to the debugger client 102. Thus data from several virtual machines are integrated and sent to the only debugger client.

FIG. 6D illustrates an embodiment of a method performed when data received at the unifying process from a current virtual machine indicates the current virtual machine is returning control to a calling routine that invoked the current routine.

In step 672, data indicating that the current routine is returning control to the calling routine is obtained from the data received from the current virtual machine in step 641. In the illustrated example, the data indicates that the current virtual machine, SQL virtual machine 123, has completed execution of the second SQL statement and is returning control to the routine that submitted the second SQL statement.

In step 674, the most recent (last) routine frame is removed from the single stack. The remaining last frame, i.e., the frame immediately above the removed frame, is the frame of the calling routine. Therefore, it is determined in step 674, using the single stack, that the Java frame 452 is the frame of the calling routine. Java routine S is associated with the Java frame 453; thus, Java routine S is the calling routine. In some embodiments, the values of variable objects associated with the removed frame are deleted. In embodiments in which the unifying process only maintains a stack of virtual machines, step 674 is omitted.

In step 676, the last frame is removed from the stack associated with the current virtual machine. For example, an SQL frame associated with the second SQL statement is removed from a stack for the SQL virtual machine. In some embodiments step 676 is omitted because the virtual machine maintains the stack for itself.

In step 678, the calling routine is made the current routine. In the illustrated example, the Java routine S becomes the current routine.

In step 680, it is determined whether the calling routine is in a module executed by the current virtual machine. If so, processing of the message from the virtual machine is complete, as represented by step 685 indicating that processing is done.

If it is determined that the current routine is not in a module executed by the current virtual machine, then control passes to step 682. For example, it is determined that the Java routine S is not in a module executed by the current SQL virtual machine. In step 682, data is received from the virtual machine that executes the current routine. The data indicates the virtual machine is continuing to execute the current routine at the point of return from the called routine. In the illustrated example, the data indicates that the JVM is continuing to execute the routine S at the point of return after submitting the second SQL statement. In step 684, in response to receiving data in step 682, the unifying process makes the virtual machine sending the data in step 682 the current virtual machine. This is done by removing the most recent (last) frame from the stack of virtual machine frames. In the illustrated example, the unifying process 142 drops the SQL frame 534 from the stack 530 and makes the JVM the current virtual machine. Processing is then completed as represented by passing control to step 685.

Using the steps of FIGS. 6C and 6D, the unifying process maintains a single stack for all virtual machines (and in some embodiments, all routines executed by all virtual machines) for the multi-module program. The unifying process integrates the debugging information, such as breakpoints, variable object IDs, variable object values, time profile information, and tracing information for all the virtual machines. Meanwhile, the debugger communicates simply with the unifying process.

Unifying Process Exchange Formats

In some embodiments, the unifying process exchanges information with each virtual machine using an interface tailored for the language of the virtual machine. For example, the unifying process uses a database management system debugging interface (DBMS_debug) for exchanging information with the PL/SQL virtual machine 123, while also using the JDWP to exchange information with the JVM 121. In such embodiments, steps 626 and 641 of the unifying process methods include steps to translate debugging information between a format used to exchange debugging information with the debugger client 102 and a different format for a virtual machine of a different language. For example, the unifying process translates debugging information between JDWP and DBMS_debug for passing debugging information between the debugger client 102 and the SQL virtual machine 122 or the PL/SQL virtual machine 123. In the illustrated embodiment described next, the translation to a common specified format is performed within one or more virtual machines instead of in the unifying process.

According to the illustrated embodiment, a particular specified interface is used for exchanging data with the debugger client. The same specified interface is used for exchanging data between the unifying process and virtual machines for two or more languages. One or more virtual machines are modified to exchange debugging information using the specified interface. In the illustrated embodiment, the SQL and PL/SQL virtual machines 122, 123 are modified to exchange debugging information with the unifying process 142 using JDWP. In this embodiment, all three virtual machines 121, 122, 123 exchange information with the unifying process using the same interface 152b, as depicted in FIG. 1.

This embodiment using the JDWP for the specified exchange format has several advantages. The JDWP allows the unifying process and the debugger client to be anywhere on the network, rather than having to be on the same host. The JDWP already works or is readily implemented in JVMs. The JDWP interface is already published; and several vendors already supply JDWP-compliant debugger clients. Also, the unifying process is simpler to design, implement and maintain because it need not include a translator between JDWP and every other debugging interface for virtual machines.

Mapping Language Constructs in a Virtual Machine

Figure 7:
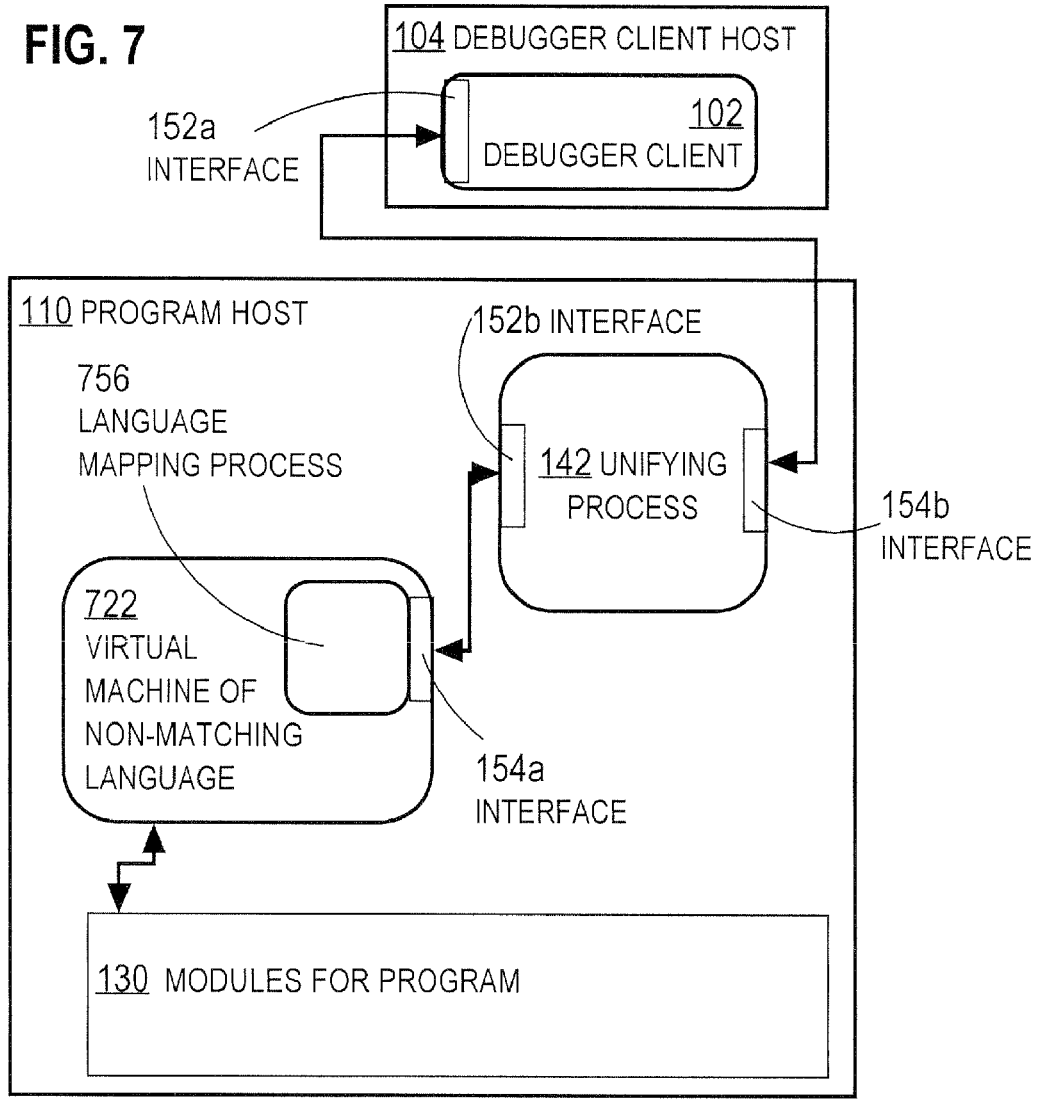
FIG. 7 is a block diagram illustrating a modified virtual machine, according to an embodiment.

FIG. 7 is a block diagram illustrating a modified virtual machine, according to an embodiment. As illustrated in FIG. 7, a virtual machine 722 is modified to include a language mapping process 756. The mapping process maps language constructs used in the interface 154a to different language constructs used in the modules interpreted by the virtual machine.

As used herein, a language construct indicates an element of the language or an element of the representation of the language at run time. A program unit is an example of a language construct. In different languages the program unit may be called a "module," "class," or "package," among other terms. A routine defined within a program unit is another example of a language construct. In different languages the routine may be called a "function," "procedure," "method," or "subroutine," among other terms. A variable is another example of a language construct. Each language usually supports several variable types or scopes, such as "static variable," "object fields," "object attributes," "local variables," or "global variables," among others. A type definition is another example of a language construct. Each language usually supports several types, such as "class," "structure," "array," "variable array," "table," "record," "integer," "floating point," or "character," among others. A position within other language constructs is itself a language construct. In different languages the position might be specified as a statement number, a line number, or a program counter.

For example, the modified PL/SQL virtual machine 722 includes a PL/SQL mapping process 756 for use with an interface 154a based on the JDWP. The mapping process 756 translates PL/SQL constructs to Java constructs for sending information out through the JDWP interface 154a and translates Java constructs to PL/SQL constructs for receiving debugging information through the JDWP interface 154a.

An advantage of the illustrated embodiment is that the modified virtual machine 722 can be used directly with any debugger client 102 using the specified interface, as well as with the unifying process using the specified interface. For example, a modified PL/SQL virtual machine that maps PL/SQL to Java constructs for the JDWP can be used directly with a JDWP-compliant debugger client 102. In an embodiment in which only modules in PL/SQL are used with a single instance of the modified PL/SQL virtual machine 722, the unifying process can be omitted. The modified PL/SQL virtual machine 722 can exchange information directly with a JDWP-compliant debugger client 102 using the JDWP interface 152a.

Figure 8:
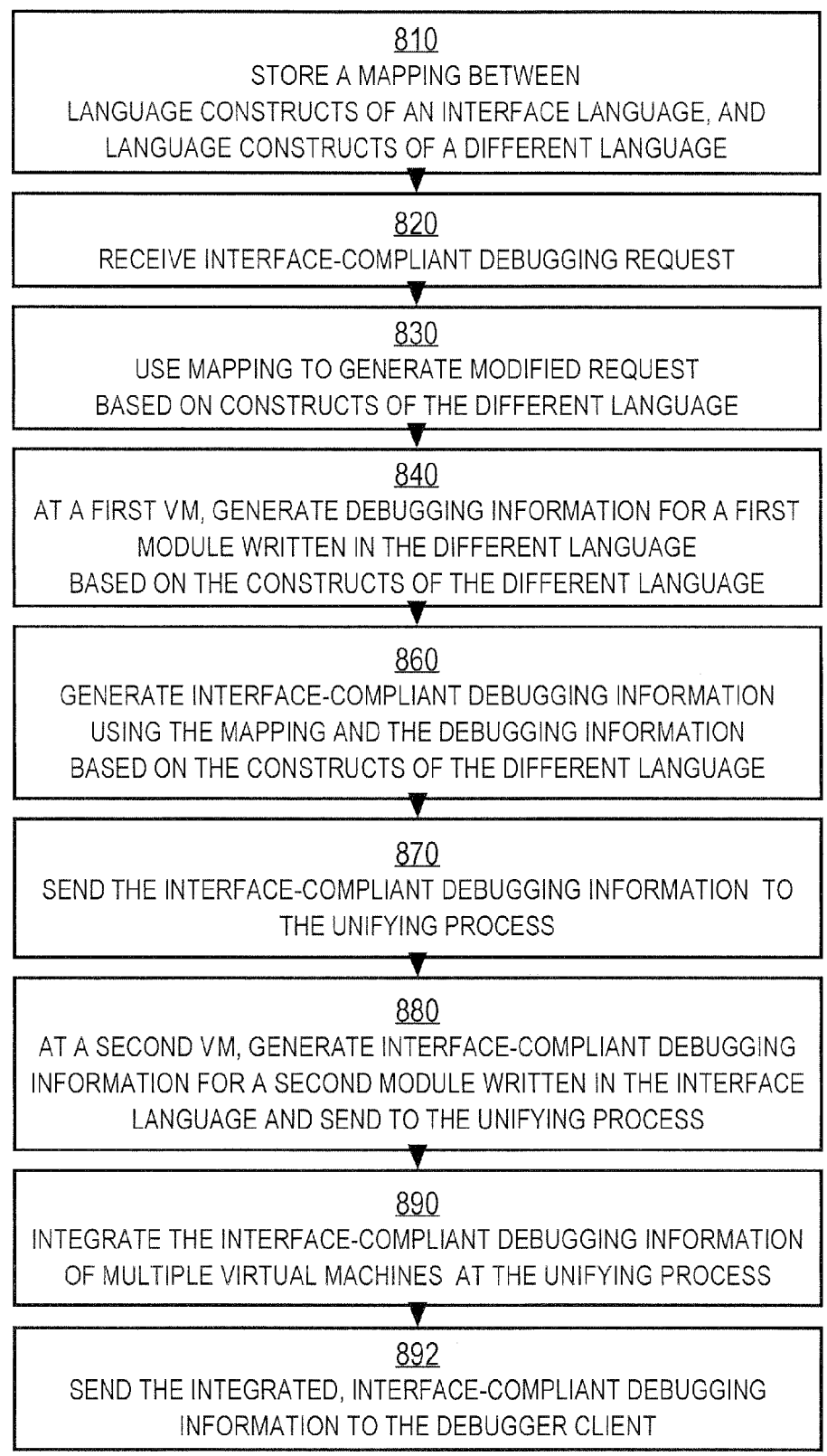
FIG. 8 is a flowchart illustrating a method for debugging a computer program having multiple language modules executed by multiple virtual machines according to an embodiment.

FIG. 8 is a flowchart illustrating a method 800 for debugging a computer program having multiple language modules executed by multiple virtual machines according to an embodiment.

In step 810 a mapping is generated and stored. The mapping maps language constructs of an interface language, used at the interface between a virtual machine and a debugger client, to and from the language constructs of a different language. For example, JDWP provides an interface that uses Java classes having methods and attributes, all named within a consistent namespace, as language constructs. To use JDWP as an interface between a PL/SQL virtual machine and a debugger client, the language constructs of PL/SQL are mapped to language constructs of Java and the language constructs of Java are mapped to the language constructs of PL/SQL. An example mapping between PL/SQL and Java is provided in more detail in the following section. In the illustrated embodiment, the mapping is stored as computer code that converts between constructs of one language and the other. In other embodiments, other mapping techniques can be employed, such as generating and storing a table in which each row contains the construct of one language in one set of one or more columns and the corresponding construct of the other language in a second set of one or more columns.

In step 820, an interface-compliant debugging request is received for a first virtual machine. The first virtual machine executes coded instructions based on a module written in a different language than the interface language. For example, the first virtual machine is the PL/SQL virtual machine 123 in embodiments in which the interface is JDWP for use with the Java language. For example, a debugging request for the values of the variables in a routine associated with a frame of the PL/SQL virtual machine 123 is received.

In step 830, the mapping stored in step 810 is used to generate a modified request using the constructs of the different language executed by the first virtual machine. For purposes of illustration, it is assumed that the module 460 is named "Averages" and belongs to the database of "SchemaB." The routine is referenced within the PL/SQL virtual machine 123 as "Averages.R." The frame associated with the routine is requested using a JDWP-compliant request specifying a frame associated with a routine named $APDBMS.package_body.SchemaB.Averages.R, so that names unique in the PL/SQL package remain unique when combined with routines in modules executed by other virtual machines, as described in more detail in the following section. Thus, in step 830, in the illustrated example, the request for variable objects in the frame associated with the routine $APDBMS.package_body.SchemaB.Averages.R is mapped to a request for variable objects in the frame associated with the routine Averages.R. In some embodiments, the mapping is done at a unifying process in step 626 and the modified request is then sent to the first virtual machine as part of step 830. In some embodiments, as depicted in FIG. 7, the mapping is done within the virtual machine itself.

In step 840, the first virtual machine, for executing coded instructions based on a module written in the different language, generates debugging information for that module. For example, the PL/SQL virtual machine 123 generates a value "February" for the variable string "MonthAveraged" defined in the PL/SQL module 460 in response to a request from a debugger client or a unifying process. The variable "MonthAveraged" has the value "February" in association with the frame in the PL/SQL stack for the routine R of the module "Averages" found in database belonging to SchemaB.

In step 860, interface-compliant debugging information is generated from the debugging information produced in step 840 and the mapping. For example, the frame associated with the routine named Averages.R is mapped to a frame associated with a routine named $APDBMS.package_body.SchemaB.Averages.R. The variable string MonthAveraged is mapped to the Java class VARCHAR2, defined in the following section. Thus, string MonthAveraged is mapped to VARCHAR2 MonthAveraged. The value of the string is stored in the attribute "_value" of the VARCHAR2 class, as defined in the following section. Thus, MonthAveraged._value="February." If the string MonthAveraged is defined to be less than 10 characters in the PL/SQL code, then this information is mapped to the attribute "_maxLength" of the VARCHAR2 class. Thus, MonthAveraged._maxlength=10. In the illustrated embodiment, the interface-compliant debugging information takes the following form. However, in JDWP the named objects and routines would be replaced by unique ID numbers which are difficult for a human to track.

method=$APDBMS.package_body.SchemaB.Averages.R.
    variable object=VARCHAR2 MonthAveraged;
    MonthAveraged._value="February";
    MonthAveraged._maxlength=10;

In step 870, the interface-compliant debugging information is sent to the unifying process. Step 870 is omitted in embodiments in which the mapping is performed within the unifying process, such as in step 626 and 641 described above. Step 870, and the following steps 880, 890 are omitted in embodiments in which all modules of the program are executed by the same instance of a virtual machine. In such embodiments, the debugging information is inherently integrated and is sent directly to the debugger process in step 892.

In step 880, a second virtual machine, for executing coded instructions based on a module written in the interface language, generates debugging information for that module. For example, the JVM 121 generates a value "Rome, N.Y., USA" for the variable, user-defined object "FirstCity" defined in the routine S of the Java module 440 named "AtoQS" in response to a request from a debugger client or a unifying process. It is assumed for purposes of illustration that the user-defined object "FirstCity" is an instance of a user-defined class "CITY." The debugging information is already in a form that can be transferred through JDWP (in JDWP the named objects and routines would be replaced by unique ID numbers):

method=AtoQS.S;
    variable object=CITY FirstCity;
    FirstCity.cityname="Rome";
    FirstCity.provincename="New York";
    FirstCity.countryname="USA";

The debugging information is sent to the unifying process in step 880 because in the illustrated embodiment there are at least two virtual machines executing the code of the multi-module program.

In step 890 the unifying process integrates the debugging information as described above with reference to FIGS. 6C and 6D and so generates integrated, interface-compliant debugging information.

In step 892 the integrated, interface-compliant debugging information is sent to the debugger client, often from the unifying process. If only one instance of a virtual machine executes all the modules of the multi-module program, then the debugging information may be sent directly from the virtual machine to the debugger client, according to some embodiments.

Example Mapping to Java Constructs in a PL/SQL Virtual Machine

In step 810, the PL/SQL constructs are mapped to Java constructs. In one embodiment, the following mapping is stored. The mapping is then used in step 860 to translate PL/SQL constructs into Java constructs.

Program Units

The following mapping is used in step 860 to translate PL/SQL program units into Java program units. It is assumed that the PL/SQL program unit is stored in a database under control of a particular database management system designated herein as "APDBMS" in which each database belongs to a schema and comprises multiple database objects.

A Java package name is constructed for each program unit according to the template "$APDBMS.(program unit type). (schema).(program unit name)." A program unit type is selected from a list including "package," "package_body," "procedure," "function," "trigger," "type" for user-defined objects, and "type_body," well known to programmers of PL/SQL. In addition, the list includes "block" for sets of instructions generated at runtime and not stored persistently with a name.

A program unit name is the name given to a program unit in PL/SQL. A program unit name is generated for a block. A program unit name for a first program unit defined inside a second program unit will concatenate the name of the of the first program unit to the name of the second program unit separated by a special symbol such as "$."

For example:
- a package named PackageA belonging to schema SchemaB is mapped to a Java package called $APDBMS.package.SchemaB.PackageA;
- a procedure named ProcP belonging to schema SchemaB is mapped to a Java package called $APDBMS.procedure.SchemaB.P ProcP;
- a procedure named ProcC belonging to package PackageA is mapped to a Java package called $APDBMS.package_ body.SchemaB.PackageA.ProcC;
- a function FuncD defined inside procedure ProcC is mapped to a Java package called $APDBMS.package_ body.SchemaB.PackageA.ProcC$FuncD; and
- an anonymous block running in schema SchemaB is mapped to a Java package called $APDBMS.block. SchemaB.1234, where 1234 is an arbitrary designation generated by the mapping process.

Data Types

The following mapping is stored in step 810 and used in step 860 to translate PL/SQL and SQL data types into Java data types and back. Data types may be primitive or composite.

Primitive Data Types

Java classes are defined for each of the primitive types and reside in the $APDBMS namespace. The classes are declared final so that a debugger client need not expend resources querying for the class type at runtime. The attribute names in the classes have a leading underscore "_". Runtime values for the attributes of the classes are always represented by an object of the java.lang.String class. The object contains a printable representation or approximation of the actual value of the PL/SQL or SQL variable or parameter. In the event that the variable or parameter is NULL in the SQL sense, the value will appear to be null in the Java sense. PL/SQL allows programmers to add constraints to variable declarations. Constraints are treated as runtime attributes of the Java classes defined for the primitive types.

For example, the primitive types are presented through JDWP as if they had been declared in Java by a "package $ APDBMS.Builtin" declaration followed by the following code fragments.

A PL/SQL boolean type is treated as a member of a BOOLEAN class defined using:

```
final public class BOOLEAN
{
String _value; // Current value: "true", "false", or null
    final boolean _canBeNull; // Can this object be set to null?
}
```

PL/SQL integer, binary integer, natural, naturaln, positive, positiven and signtype types are treated as members of an PLS_INTEGER class defined using:

```
final public class PLS_INTEGER
{
String _value;
final boolean _canBeNull;
final int _minValue; // Smallest legal value
    final int _maxValue; // Largest legal value
}
```

PL/SQL number, integer, int, smallint, decimal, numeric, and dec types are treated as members of a NUMBER class defined using:

```
final public class NUMBER
{
String value; //Value converted to String using
NLS_NUMERIC_CHARACTERS
final boolean _canBeNull;
final int _precision; // Precision "constraint"
    final int _scale; // Scale "constraint"
}
```

PL/SQL float, real, double precision types are treated as members of a FLOAT class defined using:

```
final public class FLOAT
{
String_value; //Value converted to String using
NLS_NUMERIC_CHARACTERS
final boolean _canBeNull;
final int _binaryPrecision; // Precision "constraint"
}
```

A PL/SQL date type is treated as a member of a DATE class defined using:

```
final public class DATE
{
String _value; // Value, converted to String using
```

```
        NLS_DATE_FORMAT
            final boolean __canBeNull;
        }
```

A PL/SQL time type is treated as a member of one of the following TIMESTAMP or time INTERVAL classes defined using:

```
final public class TIMESTAMP
{
String __value;
final boolean __canBeNull;
final int __secondsPrecision;
}
final public class TIMESTAMP_WITH_TIMEZONE
{
String __value;
final boolean __canBeNull;
final int __secondsPrecision;
}
final public class TIMESTAMP_WITH_LOCAL_TIMEZONE
{
String __value;
final boolean __canBeNull;
final int __secondsPrecision;
}
final public class INTERVAL_YEAR_TO_MONTH
{
String __value;
final boolean __canBeNull;
final int __yearsPrecision;
}
final public class INTERVAL_DAY_TO_SECOND
{
String __value;
final boolean __canBeNull;
final int __daysPrecision;
final int secondsPrecision;
}
```

PL/SQL string values for string types are converted to UTF-8, a standard character set well known in the art, when transported through JDWP. If a string value includes characters that cannot be represented in UTF-8, then the string value will not be accurate.

PL/SQL varchar2, varchar, and string types are treated as members of a VARCHAR2 class defined using:

```
final public class VARCHAR2
{
String __value;
final boolean __canBeNull;
final int __maxLength; // Length constraint value
}
```

PL/SQL nvarchar2 and nvarchar are treated as members of a NVARCHAR2 class defined using:

```
final public class NVARCHAR2
{
String __value;
final boolean __canBeNull;
final int __maxLength; // Length constraint value
}
```

A PL/SQL varchar2_any_cs type is treated as a member of a VARCHAR2_ANY_CS class defined using:

```
final public class VARCHAR2_ANY_CS
{
String __value;
final boolean __canBeNull;
final int __maxLength; // Length constraint value
}
```

A PL/SQL char type is treated as a member of a CHAR class defined using:

```
final public class CHAR
{
String __value;
final boolean __canBeNull;
    final int __length;
}
```

A PL/SQL nchar type is treated as a member of a NCHAR class defined using:

```
final public class NCHAR
{
String __value;
final boolean __canBeNull;
final int __length;
}
```

A PL/SQL char_any_-cs type is treated as a member of a CHAR_ANY_CS class defined using:

```
final public class CHAR
{
String __value;
final boolean __canBeNull;
final int __length;
}
```

A PL/SQL long type is treated as a member of a LONG class defined using:

```
final public class LONG
{
String __value;
final boolean __canBeNull;
    final int __maxLength;
}
```

A PL/SQL raw type is treated as a member of a RAW class defined using:

```
final public class RAW
{
String __value;
final boolean __canBeNull;
    final int __maxLength;
}
```

A PL/SQL longraw type is treated as a member of a LONGRAW class defined using:

```
final public class LONGRAW
{
String __value;
final boolean __canBeNull;
    final int __maxLength;
}
```

A PL/SQL rowid type is treated as a member of a ROWID class defined using:

```
final public class ROWID
{
String __value;
final boolean __canBeNull;
    static final int __maxLength;
}
```

A PL/SQL urowid type is treated as a member of a UROWID class defined using:

```
final public class UROWID
{
String __value;
final boolean __canBeNull;
    static final int __maxLength;
}
```

A PL/SQL mislabel type is treated as a member of a MLSLABEL class defined using:

```
final public class MLSLABEL
{
String __value;
final boolean __canBeNull;
final int __maxLength;
}
```

A PL/SQL clob type is treated as a member of a CLOB class defined using:

```
final public class CLOB
{
String __value; // First 512 bytes of value
final boolean __canBeNull;
final boolean __isOpen;
final boolean __isTemp; // Is this a temporary CLOB?
final int __length;
final int __chunkSize;
}
```

A PL/SQL nclob type is treated as a member of a NCLOB class defined using:

```
final public class NCLOB
{
String __value; // First 512 bytes of value
final boolean __canBeNull;
final boolean __isOpen;
final boolean __isTemp; // Is this a temporary NCLOB?
final int __length;
final int __chunkSize;
}
```

A PL/SQL clob_any_cs type is treated as a member of a CLOB_ANY_CS class defined using:

```
final public class CLOB_ANY_CS
{
String __value; // First 512 bytes of value
final boolean __canBeNull;
final boolean __isOpen;
final boolean __isTemp; // Is this a temporary CLOB?
final int __length;
final int __chunkSize;
}
```

A PL/SQL blob type is treated as a member of a BLOB class defined using:

```
final public class BLOB
{
String __value; // First 512 bytes of value, represented in HEX
final boolean __canBeNull;
final boolean __isOpen;
final boolean __isTemp; // Is this a temporary BLOB?
final int __length;
final int __chunkSize;
}
```

A PL/SQL bfile type is treated as a member of a BFILE class defined using:

```
final public class BFILE
{
String __value; // First 512 bytes of value, represented in HEX
final boolean __canBeNull;
final boolean __exists;
final boolean __isopen?
final int __length;
}
```

PL/SQL cursor types are treated as members of a CURSOR class and refcursor types are treated as members of a REFCURSOR class, which are not shown in the illustrated embodiment.

Members of object type REF are not directly useable in PL/SQL. They are dereferenced explicitly via SQL or UTL_REF. Thus only the type info (domain) and an surrogate locator string are provided. The REF class contains no attributes in the illustrated embodiment, but attributes may be added in other embodiments. A SQL ref type is treated as a member of a REF class defined using:

```
final public class REF
{
final String __locator; // REF locator, represented in HEX, or null
final String __domain; //The static domain type, e.g.,
                        APDBMS.type.SchemaA.PERSON
``` final boolean __canBeNull;
}

An exception type is not used internally in PL/SQL. An exception class is provided so that a user may set breakpoints on exceptions, and for exception reporting when an exception event occurs or when a ThreadReferenc.Stop is applied. The EXCEPTION class is defined using:
  public class EXCEPTION extends java.lang.THROW-ABLE{ }
A user exception class is provided to match any user-defined exceptions. The EXCEPTION_USER class is defined using:
  final public class EXCEPTION_USER extends EXCEPTION { }
A DBMS exception class is provided to match any DBMS errors. The EXCEPTION_DBMS class is defined using:
  public class EXCEPTION_DBMS extends EXCEPTION { }
For each DBMS error, "n" there is an associated class that extends the above class:
  public class EXCEPTION_DBMS_n extends EXCEPTION_DBMS { }

Composite Data Types

Java classes appear through JDWP for each PL/SQL composite type, whether declared in PL/SQL or formed with an SQL "create type" statement. The "_type" attribute of the class holds a value that provides information about the category of the type. The category is selected from a list that includes "record," "object," "varray," "nested array," and "indexed table," constructs well known to PL/SQL programmers. Attribute names for record and object types are based on the type declarations in the PL/SQL code with a leading underscore to reduce the likelihood of name collisions For example, a "personRec" record declaration in a PL/SQL procedure ProcP of schema SchemaB given by
  procedure SchemaB.ProcP is
  type personRec is record (name varchar2(100), age pls_integer);
  begin
  . . .
  end;
is represented over JDWP as if it had been declared in Java as

```
package $APDBMS.procedure.SchemaB.ProcP;
final public class PERSONREC
{
    $APDBMS.Builtin.VARCHAR2 NAME;
    $APDBMS.Builtin.PLS__INTEGER AGE;
    static final String __type = "record";
}
```

For example, an object declaration in SQL given by
  create type SchemaB.PERSON as object (name varchar2 (100), age pls_integer, "is Null" boolean);
is represented over JDWP as if it had been declared in Java as

```
package $APDBMS.type.SchemaB;
public class PERSON
{
    boolean __isNull
    $APDBMS.Builtin.VARCHAR2 NAME;
    $APDBMS.Builtin.PLS__INTEGER AGE;
    $APDBMS.Builtin.BOOLEAN isNull;
    final boolean __canBeNull;
    static final String __type = "object";
}
```

Varrays and nested tables are seen through JDWP as a class having a Java array. Varrays include an attribute named "_limit" indicating a declared maximum size, but nested tables do not. The "_type" attribute is set either to "varray" or "nested table". In the illustrated embodiment, the implied Java class includes a method named "newElement," which can be invoked with ObjectReference.InvokeMethod, to add rows to the collection. The method is a function that returns a value of the number of rows in the array after adding the row. No provision is made for deleting elements. For example, a varray declaration in a PL/SQL procedure ProcP of schema SchemaB given by
  procedure SchemaB.ProcP is
  type V is varray (10) of number;
  begin
  . . .
  end;
is represented over JDWP as if it had been declared in Java as

```
package $APDBMS.procedure.SchemaB.ProcP;
final public class V
{
    final V$element __values[ ];
    static final int __limit = 10;
    final boolean __canBeNull;
    static final String __type = "varray";
    public int newElement( );
    final public class V$element
    {
        final $APDBMS.Builtin.PLS__INTEGER __key;
        $APDBMS.Builtin.Number __value;
    }
}
```

Indexed tables are sparse arrays that are seen through JDWP as a nested class defining each element plus a wrapper class having a Java array of the elements. Each element includes a key and a value. PL/SQL does not allow indexed tables to be atomically null, so no null information is used in the wrapper class. The value in an element may be null but the key may not. In the illustrated embodiment, the implied Java class includes two methods named "newElement" and "deleteElement," which can be invoked with ObjectReference.InvokeMethod. The method newElement adds an element at the specified key, unless an element with that key already exists. The method deleteElement deletes an element at the specified key, unless the element with that key does not exist. For example, an indexed table declaration in a PL/SQL procedure ProcP of schema SchemaB given by
  procedure SchemaB.ProcP is
  type IndexedtableI is table of pls_integer index by binary_integer;
  begin
  . . .
  end;

is represented over JDWP as if it had been declared in Java as

```
package $APDBMS.procedure.SchemaB.ProcP;
final public class INDEXEDTABLEI
{
    final INDEXEDTABLEI$element __values[ ];
    static final String __type = "indexed table";
    public int newElement(int key);
    public void deleteElement(int key);
    final public class INDEXEDTABLEI$element
    {
        final $APDBMS.Builtin.PLS__INTEGER __key;
        $APDBMS.Builtin.PLS__INTEGER __value;
    }
}
```

Associative arrays are handled similarly. One difference is that the "_key" field is as declared by the user's code. Another difference is that the value of the "_type" field is "associative array."

SQL Statements

An SQL statement appears through JDWP as the execution of a method $APDBMS.SQL.execution. The internal steps and variables of this method are not further broken down into frames and are not available for setting breakpoints or values for variables. Only breakpoints on method entry and method exit are accepted. This method appears to have two local variables, "_statement" and "_binds". The "_statement" variable is of type java.lang.String, and includes the text of the SQL statement being executed. However, if the debugger client does not have sufficient privilege to see the statement, the variable contains another value, such as the text "not available." The "_binds" variable is an array of elements. Each element appears to be an instance of a Java class that has two attributes "_name" and "_value." The "_name" attribute is of type java.lang.String. The "_value" attribute is of the type "object." The variables are read only; attempts to set values for these variables are ignored.

Debugging with Multi-Tiered Virtual Machines

Figure 9:
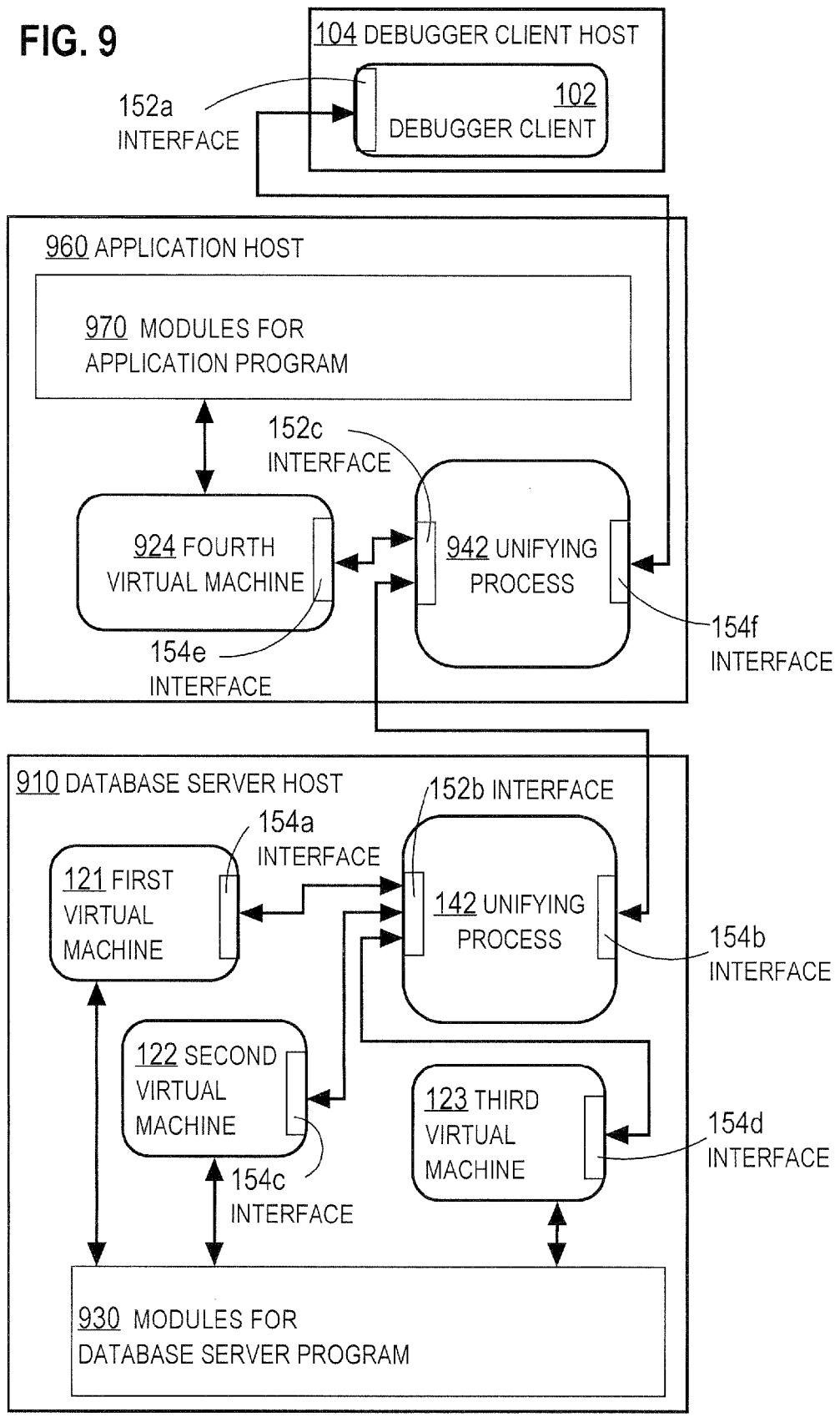
FIG. 9 is a block diagram illustrating multiple tier program modules on multiple hosts, according to an embodiment.

FIG. 9 is a block diagram of a hierarchical system of unifiers for unifying debugging information from multiple tiers of virtual machines according to an embodiment. The multi-tiered embodiments are described in the context of an application interacting with a database server of a database management system, but the invention is not limited to this context. An application program executing on an application host 960 provides a service over a network. For example, the application program is an accounting program. The program modules 970 stored on the application host 960 perform the application specific functions. To support operations that involve the storage or retrieval of data, the application makes requests to a database server executing on a database server host 910. The program modules 930 stored on the database server host 910 include the procedures stored in the database and executed based on requests sent to the database server by the application. For example, instructions that compute the average costs to certain departments based on data in the database could be stored as a procedure in the database.

As depicted in FIG. 9, first, second and third virtual machines 121, 122, 123, respectively, reside on the database server host 910 for running the modules 930 stored in the database. A unifying process 142 executes on the database server host 910 to unify the debugging information from the first, second and third virtual machines, 121, 122, 123. In some embodiments, the first virtual machine 121 is an instance of a Java virtual machine for running Java modules stored in the database, the second virtual machine 122 is an instance of an SQL virtual machine for executing SQL statements stored in the database or generated by one of the other modules, and the third virtual machine 123 is an instance of a PL/SQL virtual machine for executing PL/SQL modules stored in the database. The unifying process 142 includes debugger client interface 152*b* and virtual machine interface 154*b*. The first, second and third virtual machines include virtual machine interfaces 154*a*, 154*b*, 154*c*, respectively.

Also depicted in FIG. 9, is a fourth virtual machines 924 residing on the application host 960 for running the modules 970 for the application. A second unifying process 942 executes on the applications host 960 to unify the debugging information from the first unifying process 142 and the fourth virtual machine 924. In some embodiments, the fourth virtual machine 924 is another instance of a JVM for running Java modules. The fourth virtual machine 924 includes virtual machine interface 154*e*. The second unifying process 942 includes debugger client interface 152*c* and virtual machine interface 154*f*.

The unifying processes 142, 942 serve to generate a coordinated picture of debugging information that is presented to the user by the debugger client 102. The first unifying process 142 coordinates the debugging information for virtual machines 121, 122, 123, and the second unifying process 942 coordinates the debugging information for the first unifying process 142 and the fourth virtual machine 924.

According to one embodiment, when a routine being executed by the fourth virtual machine calls a stored procedure on the database server, the network address of the second unifying process 942 is conveyed to the first unifying process 142. Then, the debugging information sent from the first unifying process 142 is forwarded to the second unifying process 942 instead of to the debugger client 102. For example, the information is passed during step 610 described above, and in step 612 the unifying process 142 connects to the second unifying process 942 instead of to the debugger client 102.

Although shown residing on the application host 960, the use of a network protocol for the interfaces 152 and 154 allows the second unifying process 942 to reside anywhere on the network. Also, the use of a network protocol for the interfaces 152 and 154 allows the first unifying process 142 to reside anywhere on the network.

Furthermore, although only two unifying processes are shown in FIG. 9, each occupying a different level in a hierarchy, in other embodiments multiple unifying processes may be deployed at two or more levels of a hierarchy.

Hardware Overview

Figure 10:
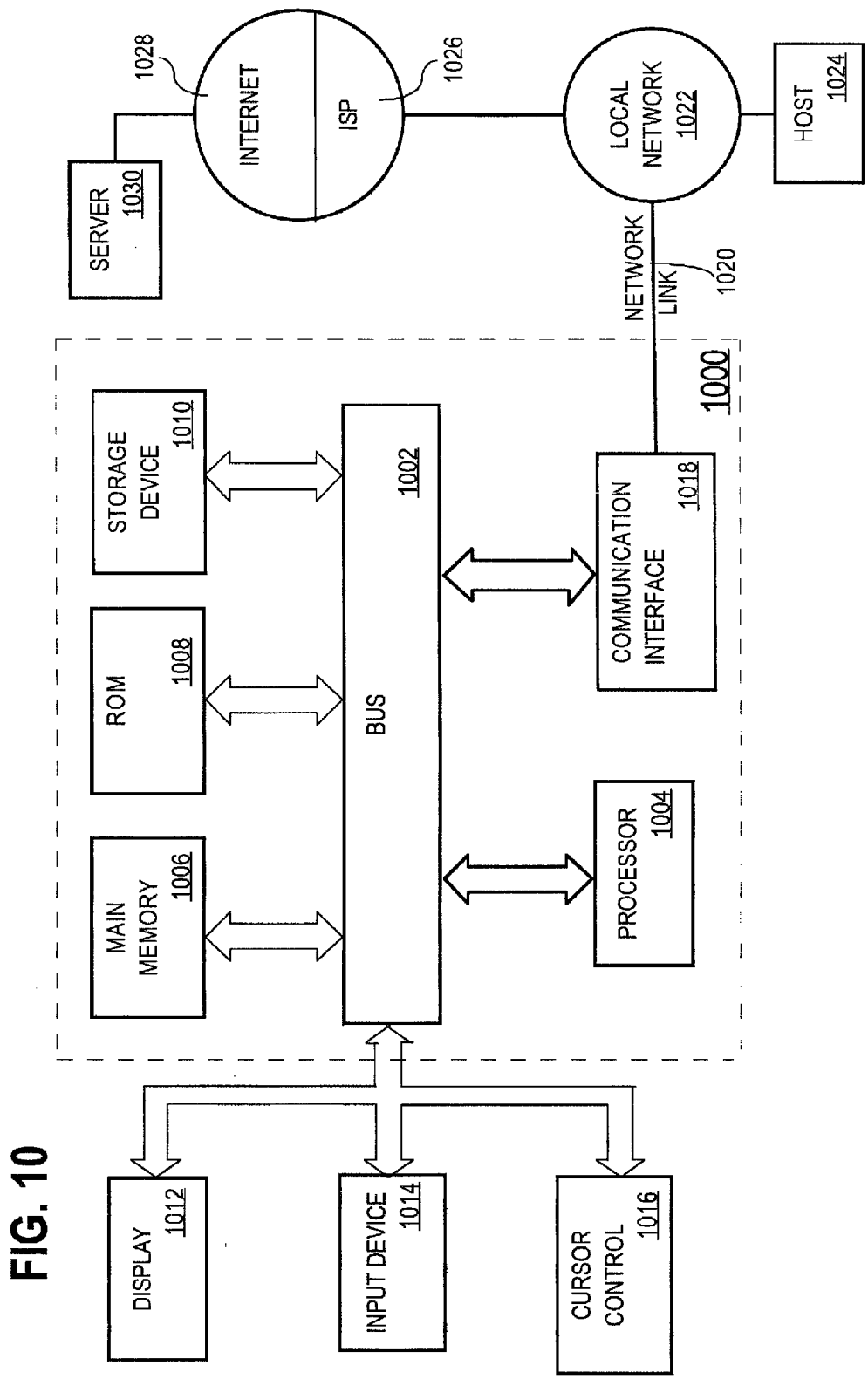
FIG. 10 is a block diagram that illustrates a computer system 1000 upon which an embodiment of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. A computer-readable storage medium includes volatile and non-volatile storage media. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for debugging a computer program that includes a plurality of modules executing on a plurality of machines, the method comprising the steps of:

receiving, at a unifying component, first data from a first machine of the plurality of machines, wherein the first data indicates debugging information generated by the first machine regarding a first module currently executing on the first machine;

receiving, at the unifying component, second data from a second machine of the plurality of machines, wherein the second machine indicates debugging information generated by the second machine regarding a second module executing on the second machine concurrently with execution of the first module on the first machine;

based on the first data and the second data, generating unified debugging information that appears to a user as though the debugging information pertains to a single computer program; and displaying the unified debugging information to a user;

wherein generating unified debugging information comprises interleaving frames from a first module executing on the first machine with frames from a second module executing on the second machine, thereby generating a stack in which (a) frames from the first module are in between frames from the second module and (b) frames from the second module are in between frames from the first module;

wherein the method is performed by one or more computing devices.

2. The method of claim 1, wherein the step of generating unified debugging information comprises:

based on the first data and the second data, generating a unified stack that includes both frames from a first module executing on the first machine and frames from a second module executing on the second machine.

3. The method of claim 1, wherein the unified debugging information organizes debugging data from multiple threads to appear as debugging data from a single thread.

4. The method of claim 1, wherein displaying the unified debugging information to the user comprises displaying the unified debugging information, comprising debugging information from both the first machine and the second machine, to the user in a single user interface, wherein the user does not need to switch between multiple user interfaces to view debugging information from the first and second machines.

5. The method of claim 1, wherein the debugging information generated by the first machine is debugging information generated from executing first code that is written in a first programming language, and wherein the debugging information generated by the second machine is debugging information generated from executing second code that is written in a second programming language that differs from the first programming language.

6. The method of claim 5, wherein a routine in the first code calls a function in the second code.

7. The method of claim 1, wherein the debugging information generated by the first machine is debugging information generated from executing first code that is written in JAVA, and wherein the debugging information generated by the second machine is debugging information generated from executing second code that is written in Procedural Language/Structured Query Language (PL/SQL).

8. The method of claim 7, wherein a JAVA Database Connectivity (JDBC) routine in the first code executes a Structured Query Language (SQL) query in the second code.

9. The method of claim 1, wherein the step of generating unified debugging information comprises:

based on the first data and the second data, generating a unified stack that (a) includes both frames from a first module executing on the first machine and frames from a second module executing on the second machine and (b) shows an order in which frames within the stack were executed relative to each other.

10. A volatile or non-volatile computer-readable storage medium store instructions that are executable to cause one or more processors to perform steps comprising:

receiving, at a unifying component, first data from a first machine of the plurality of machines, wherein the first data indicates debugging information generated by the first machine regarding a first module currently executing on the first machine;

receiving, at the unifying component, second data from a second machine of the plurality of machines, wherein the second machine indicates debugging information generated by the second machine regarding a second module executing on the second machine concurrently with execution of the first module on the first machine;

based on the first data and the second data, generating unified debugging information that appears to a user as though the debugging information pertains to a single computer program; and displaying the unified debugging information to a user;

wherein generating unified debugging information comprises interleaving frames from a first module executing on the first machine with frames from a second module executing on the second machine, thereby generating a stack in which (a) frames from the first module are in between frames from the second module and (b) frames from the second module are in between frames from the first module.

11. The computer-readable storage medium of claim 10, wherein the step of generating unified debugging information comprises:

based on the first data and the second data, generating a unified stack that includes both frames from a first module executing on the first machine and frames from a second module executing on the second machine.

12. The computer-readable storage medium of claim 10, wherein the unified debugging information organizes debugging data from multiple threads to appear as debugging data from a single thread.

13. The computer-readable storage medium of claim 10, wherein displaying the unified debugging information to the user comprises displaying the unified debugging information, comprising debugging information from both the first machine and the second machine, to the user in a single user interface, wherein the user does not need to switch between multiple user interfaces to view debugging information from the first and second machines.

14. The computer-readable storage medium of claim 10, wherein the debugging information generated by the first machine is debugging information generated from executing first code that is written in a first programming language, and wherein the debugging information generated by the second machine is debugging information generated from executing second code that is written in a second programming language that differs from the first programming language.

15. The computer-readable storage medium of claim 14, wherein a routine in the first code calls a function in the second code.

16. The computer-readable storage medium of claim 10, wherein the debugging information generated by the first machine is debugging information generated from executing first code that is written in JAVA, and wherein the debugging information generated by the second machine is debugging information generated from executing second code that is written in Procedural Language/Structured Query Language (PL/SQL).

17. The computer-readable storage medium of claim 16, wherein a JAVA Database Connectivity (JDBC) routine in the first code executes a Structured Query Language (SQL) query in the second code.

18. The computer-readable storage medium of claim 10, wherein the step of generating unified debugging information comprises:

based on the first data and the second data, generating a unified stack that (a) includes both frames from a first module executing on the first machine and frames from a second module executing on the second machine and (b) shows an order in which frames within the stack were executed relative to each other.

* * * * *

UNITED STATES PATENT AND TRADEMARK OFFICE
CERTIFICATE OF CORRECTION

| | | |
|---|---|---|
| PATENT NO. | : 8,321,838 B2 | Page 1 of 1 |
| APPLICATION NO. | : 12/022076 | |
| DATED | : November 27, 2012 | |
| INVENTOR(S) | : Alpern | |

It is certified that error appears in the above-identified patent and that said Letters Patent is hereby corrected as shown below:

In column 4, line 47, after "embodiment" insert -- ; --.

In column 12, line 13, delete "FIG. 3" and insert -- FIG. 5 --, therefor.

In column 20, line 38, delete "database client 102," and insert -- debugger client 102, --, therefor.

In column 26, line 42, delete "String value;" and insert -- String_value; --, therefor.

In column 30, line 45, delete "isopen?" and insert -- isOpen? --, therefor.

In column 31, line 38, after "collisions" insert -- . --.

In column 31, line 60, delete ""is Null"" and insert -- "isNull" --, therefor.

In column 37, line 13, in Claim 1, after "module;" insert -- and --.

In column 37, line 49, in Claim 8, delete "(SQL" and insert -- (SQL) --, therefor.

In column 37, line 59, in Claim 10, delete "store" and insert -- storing --, therefor.

In column 38, line 9, in Claim 10, after "user;" insert -- and --.

Signed and Sealed this
Twelfth Day of March, 2013

Teresa Stanek Rea
*Acting Director of the United States Patent and Trademark Office*